United States Patent [19]

Roesel, Jr. et al.

[11] Patent Number: 4,663,536

[45] Date of Patent: May 5, 1987

[54] A.C. MOTOR-GENERATOR

[75] Inventors: John F. Roesel, Jr.; Ronnie J. Barber, both of Bradenton, Fla.

[73] Assignee: Precise Power Corporation, Bradenton, Fla.

[21] Appl. No.: 708,140

[22] Filed: Mar. 4, 1985

[51] Int. Cl.⁴ .............................................. H02P 5/28
[52] U.S. Cl. ....................................... 290/7; 318/705; 318/720; 318/729; 318/814; 290/45
[58] Field of Search ............... 318/701, 705, 767, 720, 318/729, 814, 800; 310/156, 265, DIG. 2, 162, 163, 112; 290/7, 45

[56] References Cited

U.S. PATENT DOCUMENTS

| | | | |
|---|---|---|---|
| 4,095,149 | 6/1978 | Wanlass | 318/767 |
| 4,168,459 | 9/1979 | Roesel, Jr. | 310/112 |
| 4,190,793 | 2/1980 | Parker et al. | 318/800 |
| 4,262,209 | 4/1981 | Berner | 290/7 |
| 4,346,303 | 8/1982 | Bukatarevic | 290/45 |

Primary Examiner—Bernard Roskoski
Attorney, Agent, or Firm—Frederick Shapoe

[57] ABSTRACT

A compact, high efficiency non-interruptive motor generator power system for generating and supplying to a load A.C. of a substantially constant frequency and of a substantially constant voltage, the motor thereof being a synchronous A.C. motor energizable from a source of irregular and interruptible A.C. line power, the generator being capable of converting its rotational energy into the A.C. output for many seconds after interruption of the A.C. line power. The power system comprises a high efficiency, synchronous permanent magnet A.C. motor and an A.C. generator coupled to and driven by the motor. Both the motor and generator have a high rotational enertia common rotor wherein an outer cylindrical shell contains motor and generator rotor elements of high permeability soft magnetic material with a surface layer of magnetizable permanent magnetic material, and in each stator is an excitation coil, energizable with A.C., having a pole piece adjacent a layer of permanent magnetic material whereby to magnetize the layer into a selected pattern of north and south magnetic poles. The motor stator is within and encircled by the common rotor and has power windings producing a rotating magnetic field while the generator stator has windings for generating the A.C. power to the load during rotation of the so-magnetized rotor. Both stators also have feedback windings. In the motor stator, the feedback windings generate A.C. of a selected magnitude and phase which is conveyed by a resonant circuit to the excitation coil and there combined so as to provide energization thereof by A.C. of such strength and phase condition as to magnetize the layer of permanent magnetic material into the selected pattern. In the generator, the A.C. generated in the feedback windings is conveyed by an electrical circuit to the generator excitation coil which will essentially neutralize any A.C. induced therein by the magnetic field as the speed changes through the synchronous speed.

14 Claims, 8 Drawing Figures

RIDE-THROUGH DURATION vs LOAD

A.C. MOTOR-GENERATOR

CROSS REFERENCE TO RELATED APPLICATION

This application is related to co-pending application Ser. No. 06/679,834 filed Dec. 10, 1984 and issued on Jul. 15, 1986 as U.S. Pat. No. 4,600,873 entitled "Synchronous A.C. Motor", in which the present inventors are the co-inventors.

BACKGROUND OF THE INVENTION

Much electrical and electronic equipment requires A.C. power of relatively constant and precise characteristics in order to function properly. For such sensitive equipment any material change in frequency or voltage from certain lower and upper limits or momentary or brief complete power interruptions can result in serious misfunctioning or malfunctioning, and losses and damage to either the sensitive equipment or its work, or both, can occur. Computers, for example, can lose their programs or fail to properly complete the work being processed, and have memory failures, and electrical machines operated by computers can be harmed and/or the materials being worked on damaged or destroyed, due to even brief A.C. power failures of only a few cycles and power line faults of as little as a 20% undervoltage or overvoltage and high voltage spikes, or a change in frequency of as little as a half cycle per second.

Most electrical and electronic equipment is powered by public utility A.C. power lines and, normally, these utility power lines are quite reliable in delivering A.C. at specified voltages and frequency. However, it is well known that utility A.C. power lines are subject to numerous minor faults, often numbering several thousand a year, which faults may involve substantial voltage variations, both under- and overvoltages, frequent brief outages lasting from a few cycles to a few seconds, and occasional major A.C. faults and complete power interruptions for substantial periods of time, which may extend from several minutes to one or more days at a time. Extremes of weather, fires, accidents, and similar occurences together with the electric utility's normal operating procedures under such circumstances, can result in major reductions of voltages known as "brownouts", or lengthy complete interruptions. In the typical utility system less than 5% if these irregularities and disturbances last for more than 10 to 15 seconds. In one recent study of a major public utility, covering a 4 month period in which, over and beyond many minor line irregularities, slightly over 100 power line problems capable of materially affecting computers were noted: in this period the utility line had 8 total outages of under 0.5 seconds, 7 outages of from 0.5 to 1 second, 5 outages lasting from 1 to 30 seconds, and 3 were over 30 seconds. Other utility lines may have more than this number and pattern of power line irregularities. Generally, from 1% to 5% of the material irregularities exceed 30 seconds.

In order to protect sensitive electrical and electronic equipment against A.C. power supply irregularities, there have been suggested a variety of protective devices for interposition between the A.C. power supply and such equipment. Some of such protective devices are designed for minimal protection at a low cost and comprise spike suppressors and line filters, and the like. For greater protection more costly devices such as isolation transformers and voltage regulators can be employed. For protection against voltage spikes and similar voltage and frequency irregularities and also for supplying power during brief power interruptions of from about 1/10 second to a maximum of about $\frac{1}{3}$ second, more costly motor generator sets are used. However, the available motor-generator sets, which normally must operate continuously, have relatively low overall electrical efficiency, being in the range of from about 65% to 75% for 10 to 20 KW units and with only slightly higher efficiencies for higher capacity units of 50 to 100 KW. Further, their "ride through" time of less than about $\frac{1}{3}$ of a second is not sufficient to supply the load in the many cases where the interruptions last from about $\frac{1}{3}$ of a second and up to 15 to 60 seconds, nor do they allow sufficient time to transfer the load to a stand-by engine-generator set. For the most complete protection, including power interruptions lasting for several seconds and up to several hours, there are often used complex and expensive systems comprising a set of storage batteries coupled with electrical converters, and an array of electronic controls, and battery chargers. These battery based systems require a separate battery room, need frequent and considerable maintenance and in many cases replacement of the batteries is needed after only 3 to 4 years of use.

Where the electrical devices and equipment must be supplied with electrical power at all times, as in hospitals and police stations, it is usually necessary to provide back-up systems to the normal utility line hook-up, comprising an auxiliary gasoline or diesel engine driven electrical generator unit that is put into operation when the A.C. power line fails completely. It takes some few seconds, typically from 5 to 10 seconds, for a properly maintained engine-generator unit to start and begin delivering power when complete A.C. utility line interruptions occur. During these few seconds the computers and other sensitive equipment coupled to or controlled by the computer will often undergo program, memory and work loss, or actual equipment damage will occur.

To take care of up to some 98% of power line irregularities and faults, it is highly desirable to have available a relatively low cost, non-interruptible power system (NIPS) unit which will take the normal A.C. power from a utility line or other A.C. source, and will generate A.C. of a selected substantially constant frequency and voltage which is delivered to a sensitive load regardless of any supply line irregularities, including complete power interruptions lasting from at least about 15 seconds to a minute, such NIPS unit being electrically efficient, easy and inexpensive to use and to maintain, and is highly reliable. Such 15 seconds to a minute ride-through time period allows the operators of the sensitive equipment to cycle it down safely, and to safely handle or remove the work being processed in robotic devices or computer controlled apparatus, and thereby prevent or minimize damage to the apparatus and/or the work. The present invention will provide a NIPS unit having these desired characteristics. Where continued A.C. supply to the load is required at all times the ride-through time of such a NIPS is sufficient to allow an auxiliary engine-generator to be put into operation to supply the NIPS motor with A.C. so that it will continue to generate for the sensitive load the desired A.C. without a break.

PRIOR ART

The present invention is an improvement over the earlier inventions of one of the inventors here, as set forth in U.S. Pat. Nos. 3,521,149 issued July 21, 1970, entitled "Electric Power Generator"; 3,931,535 issued Jan. 6, 1976, entitled "Constant Frequency Motor Generator Set With Only One Rotor"; and 4,168,459 issued Sept. 18, 1979, entitled "Non-Interruptive Power Supply Systems". One of the critical problems encountered in building and operating the motor generator units of these patents was in providing a economical, reasonably sized motor capable of starting and bringing the units to full speed and then powering the unit at such full speed at full A.C. load output. In order to obtain the highest practical rotational inertia in these patented generator systems, it was found desirable to use 2 pole rotors operating at approximtely 3600 RPM when supplied 60 Hz A.C. or at about 3000 RPM when supplied 50 Hz A.C. No reasonably practical electrical A.C. motor was commercially available, nor was any known, that could or would start and bring the motor and generator rotors up to full speed. A 7.5 KW unit, such as shown in FIG. 1 of U.S. Pat. No. 4,168,459 has a moment of inertia of about 240 lb-ft squared and NEMA guidelines suggest a 300 horsepower induction motor to start and accelerate such generator to full speed under these conditions. Many major electrical motor manufacturers were consulted and none was able to supply or even suggest a reasonably sized and priced motor that was satisfactory for this application. Several major manufacturers submitted samples of specially made induction motors with special starting controls that were tested and all were found to have severe operating deficiencies for this application.

In order to overcome this critical problem, the inventor in those patents devised the best practical combination of two A.C. motors, as shown in FIG. 1 of U.S. Pat. No. 4,168,459, one being a starting A.C. motor of some 10 horsepower (7.5 KW) comprising a specially constructed induction motor having a high resistance rotor and the second being a running motor of some 20 horsepower rating (15 KW) which comprised a conventional high efficiency A.C. induction motor to take over and drive the motor generator unit after the starting motor had brought the combined generator and motor rotors up to about 75% to 80% of the full running speed. A number of NIPS units as shown in that patent were built and operated in commercial use for some years. The two motors took some 4 minutes to bring the rotors up to full speed. Furthermore, the use of two motors and the necessary switches, interconnections, and controls obviously substantially increased the cost and reduced the overall efficiency of the NIPS unit. No synchronous motor was known or available that would be suitable for use in the patent apparatus of U.S. Pat. No. 4,168,459 or even for use as the second or running motor. Synchronous 2 pole motors are uncommon and have special problems in reaching synchronous speed when connected to even modest inertial loads. Further, they are rarely built in sizes smaller than 100 KW. Consequently, in the combination of U.S. Pat. No. 4,168,459, the second, or running, motor had to be an induction motor, always necessarily operating below synchronous speed, and accordingly the excitation coil in the generator had to be energized at all times to continually correct the pattern of magnetic north and south poles in the layer of permanent magnetic material so that the generator A.C. potential output was at the required constant frequency and voltage.

Particularly adapted for use in the present invention the inventors have developed a novel synchronous motor that, though relatively small, develops a high starting and running torque so that it can easily start rotation of the NIPS unit from standstill and accelerate it up to running speed both quietly and smoothly, while being subjected to very high inertia loads, and will readily attain and maintain synchronous speed, all with extremely high electrical efficiency and without drawing high or excessive starting currents.

While U.S. Pat. No. 3,391,535 teaches, as shown in FIG. 4 for instance, combining an induction motor and an A.C. generator with a unitary rotor, at the time that that combination was suggested, it was intended primarily for frequency converters (see column 1, lines 27 to 31) and the like with no significant requirement for long ride-through times requiring a rotor having an extremely high rotational inertia. Such a combined structure would be less practical or feasible in high inertia applications for it would require a grossly excessive induction motor of well over 50 to 60 horsepower (37 to 45 KW) to start the high rotational inertia load and to operate at an acceptable slip at full speed, to rotate a generator having a rating of, for example, 7.5 KW to 10 KW output capacity. This gross disparity in motor to generator capacity and size would not only be excessively costly, but quite inefficient. No known or available synchronous motor could be used in such a combined unit since synchronous motors are quite exacting in the conditions under which they will reach full synchronous speed. They start by inducton and accelerate to a point short of synchronous speed where their field poles are energized and they must accelerate rather abruptly, in ½ cycle, to full synchronous speed. This last step limits to a small value the inertial load that can be applied to any known synchronous motor.

None of these prior art patents teach or disclose many critical features of the present invention. In particular, feedback windings are present in both the motor and the generator stators of the present invention, wherein their mode of utilization and the electrical circuitry for applying their A.C. outputs with the A.C. potentials generated in their respective excitation coils are novel and far removed from the teachings of the prior art. Thus, in the generator, the A.C. output potential of the feedback winding in the generator stator is effected through a circuit where, as long as synchronous rotor speed is present, this A.C. potential is so applied as to effectively cancel out or suppress any concurrent A.C. potential generated in the excitation coils. Because the generator revolves at synchronous speeds in most applications, the excitation coils in the generator need not be energized at all times, and the energization of the excitation coils can be more simply and adequately effected by A.C. potential applied directly from the frequency and voltage control means. There is no known motor involving only an excitation coil to magnetize a layer of permanent magnet material on the rotor, and including a feedback winding and a resonant circuit combined therewith whereby no external A.C. power source for the excitation coil is needed. Further, there is a novel arrangement of power windings in the generator stator enabling accurate voltage control of the A.C. output. Other features novel over the prior art will be made evident in the description.

SUMMARY OF THE INVENTION

The main objective of the invention is to provide a relatively compact A.C. motor-generator NIPS that is of low cost, highly efficient, reliable, quiet, and easily and inexpensively maintained, and is without any commutators, slip-rings, or brushes. The NIPS unit is normally supplied A.C. power from the public utility A.C. power line, or other A.C. source, that is subject to a wide range of A.C. power line irregularities, including occasional complete power interruptions. The motor of the NIPS unit is a novel synchronous motor that has relatively low starting current requirements and can be directly connected to the power line, and it is capable of starting and accelerating the high rotational inertia loads of the common motor and generator rotors so as to bring them up easily and smoothly to reach synchronous speed without excessive currents being drawn. The generator output is A.C. potential of a selected substantially constant frequency and voltage to be supplied to sensitive loads regardless of power line irregularities and even complete interruptions of up to from 15 seconds to as much as a minute. The rotational energy of the combined rotor is sufficient to generate the desired A.C. output for such periods of time when utility A.C. power is interrupted. Thus, the sensitive load is completely insulated and isolated from the A.C. power source, including the exceptional complete interruption lasting more than from about 15 seconds up to a minute. This gives the operators of the sensitive equipment time to either cycle it down and to safely terminate operation of the equipment, or if available, to start and bring up to full power an auxiliary engine-generator unit which can begin supplying A.C. to the motor of the NIPS unit while it is still running and before it has reached its lowest effective operating speed. Consequently, A.C. output to the load can be supplied without any noticable change in the frequency or voltage regardless of the power line irregularities.

A preferred form of the NIPS motor generator comprises a high rotational inertia common rotor encircling and revolving about a central stator. This form of the invention comprises a supporting base resiliently carrying a fixed elongated shaft member supporting the motor and generator stator components and to which, at or near each of the ends thereof, is attached a housing within which is fixedly attached the stationary race of an anti-friction bearing from whose other race is supported and affixed a large cylindrical shell member containing the motor and generator rotor components encircling the stator components, and all being rotatable coaxially on the bearings. The cylindrical shell member and the motor and generator rotor components attached thereto have a very high rotational inertia.

Attached to the interior wall of the cylindrical shell member at one end thereof is a motor rotor core portion. The motor rotor comprises three major components: (1) a first layer of magnetizable permanent magnetic material of high electrical resistance such as a ferrite having an exposed circular surface coaxial with the axis of the shell; (2) an annular supporting ring for the first layer comprising a low eddy-current, high permeability ferromagnetic material such as a stack of laminations of silicon-steel; and (3) a ferromagnetic material having high electrical conductivity, and it can be either (a) a continuation of the stack of laminations of the second component with electrical conductors buried or disposed therein to develop a high electrical current when a rotating magnetic field passes through it, or (b) the third component can be an annular ring of a ferromagnetic material of good electrical conductivity such as an annular ring of soft steel or iron supporting the second component.

Beginning at a position adjacent to the annular motor rotor core, and extending to the other end of the space within the shell member, is affixed an annular generator rotor core. The annular generator core may comprise laminations of soft magnetic material of high permeability, such as silicon-steel sheets coated with an electrically insulating material, with an interior surface of circular cylindrical shape coaxial with the axis of rotation of the shell member, and on this last cylindrical surface is firmly attached one or more layers of magnetizable permanent magnetic material, such as a ferrite, the exposed surface of each layer being of a circular cylindrical shape and coaxial with the rotational axis of the shell.

Mounted upon that portion of the elongated fixed or stationary shaft member enclosed within the shell member are both the synchronous driving motor stator and the main generator stator. Fixed to the shaft member and radially aligned with the annular motor rotor core is a slotted magnetic core of low eddy current loss, soft magnetic material juxtaposed with and axially coextensive with the rotor core, having an outer circular cylindrical surface coaxial with the rotor axis, with a rotational clearance space between this outer surface and the cylindrical surface of the layer of permanent magnetic material on the motor rotor core. The slotted core has two relatively large slots, with a wedge-shaped portion of the soft magnetic material separating the slots, to receive an excitation coil in the large slots so that the wedge-shaped portion forms a pole piece therefore. More than one excitation coil may be disposed on the stator core, preferably circumferentially symmetrically spaced from each other. When single phase A.C. flows in the excitation coil a strong magnetic flux of alternating north and south polarity is produced at the tip of the pole piece and can magnetize the layer of permanent magnetic material passing immediately adjacent the exposed narrow tip of the pole piece during the rotor's rotation, into a desired pattern of alternate north and south magnetic poles of a selected magnetic strength. The remainder of the slots in the motor stator core carry power windings so arranged that when receiving A.C. line power they will produce a rotating magnetic field reactive with the rotor core to cause it to rotate. Leads to the power windings and to the excitation coil pass through openings into an internal hollow space in the end of the stationary shaft member and extend through the hollow to the exterior where they are connected to circuit breakers, fuses, and controls and thence to the A.C. utility power line. Also placed in several of the slots are feedback windings which are connected in a resonant circuit with the excitation coil.

Affixed to the stationary elongated shaft member in radial alignment with each layer of magnetic material on the annular core members comprising the rotor of the generator are a similar number of juxtaposed and axially coextensive slotted stator core members of a soft magnetic and low eddy current loss material. Hereinafter, reference will be made to three layers and three stator cores to produce three phase A.C. output from the generator. For single phase A.C. output, a single stator is used, for two phase A.C. output, two stator cores are used, and so on. The outer surface of each core member is of circular cylindrical shape coaxial with the rotational axis of the shell, and arranged with a rotational clearance with respect to the adjacent layers of permanent magnetic material on the rotor core. Each of these stator cores is generally similar to the motor stator core, and has two adjacent relatively large slots with a wedge-shaped pole portion therebetween to receive an excitation coil encircling the wedge-shaped pole piece portion in these two slots. When the three excitation coils are each energized with single phase A.C. of a desired frequency and magnitude from a control means they will cause a strong magnetic flux of alternating north and south polarity to be generated and directed through the wedge-shaped portion which functions as a pole piece and, being spaced close to its associated layer of permanent magnetic material, the latter, during the rotation of the rotor, will be magnetized thereby into a pattern of north and south magnetic poles. It is prefered that these three sets of large slots be symmetrically circumferentially displaced and arranged with respect to each other. Thus, when viewed from the end of the shaft member, in the first core of the three cores, the large slots would be in a given position, while in the next core the large slots will be at a point 120 degrees clockwise of this position, while in the third core the large slots will be at a point 120 degrees counter-clockwise with respect to the first core's large slots.

There are smaller slots uniformly arranged along the rest of the circumference of each stator core. In these smaller slots are disposed windings in which A.C. potential will be generated during rotation of the magnetized layer of the rotor. The smaller slots in all the generator stator cores are preferably aligned more or less in the same straight axially prolonged line. It is a feature of this invention to place the same turns of each winding at the same time in all three cores. Accordingly, each single turn or conductor of a winding extends substantially parallel to the axis through all the cores, and the end turns where two or more turns form a single winding will be present only at the outermost faces of the first and last cores. Being so arranged, each winding will be energized with A.C. potential in each core and will receive a third of its A.C. potential in each core. Then leads from the last turn in a given winding will go directly to a passage or slot leading to a central internal hollow in the fixed supporting shaft end where it will pass along the central hollow and proceed to the exterior of the generator. Leads to the three excitation coils in a 3 phase generator will also pass from the exterior through the hollow and then through the slot or passage through the wall of the shaft member and then radially upward along the face of the end core, two pairs of leads will extend through the slots in the end core, one pair going to the second core, and the last pair going to the third core, where they are joined to their respective excitation coils.

Also present in each generator stator core is a feedback winding placed in several selected slots. The feedback windings generate A.C. potential when the magnetized layer sweeps by, and a similar A.C. potential is also being concurrently generated in the excitation coil. Circuit means are provided to convey the A.C. potential generated in the feedback windings in a given core to its excitation coil.

When the generator rotor is revolving at synchronous speed it is desired not to have any such self generated A.C. in the excitation coil and the circuit means is so adjusted as to cause the A.C. potential from the feedback winding to substantially cancel or suppress any A.C. generated in the excitation coil so that the control means effectively supplies the I squared R losses only in the generator excitation coils. However, when the rotor speed falls below or rises above synchronous speed the circuit means will cause at least some of the A.C. from the feedback winding to modify the A.C. being generated in the excitation coil to provide a supplemental voltage to complement the A.C. voltage from the control means and stabilize the excitation control circuit so that the pole pattern in the permanent magnetic layer on the rotor is being adjusted in order to maintain a predetermined frequency output.

To provide for an auxiliary source of A.C. power for the controls for the generator in particular, a small permanent magnet (PM) generator is attached at one end of the cylindrical shell. The rotor of the PM generator comprises a ring attached to the cylindrical shell at one outside face and rotatable therewith, usually at the motor section, with an inside layer of permanent magnets presenting a fixed succession of north and south magnetic poles, while the stator comprises a slotted core of soft magnetic material mounted on a fixed support with power generating windings therein to generate A.C. as the rotor sweeps by.

Electrical and electronic control means are provided to take the high frequency A.C. generated in the high frequency permanent magnet generator located outside the end plate of the cylindrical shell to convert it to a required frequency and magnitude of A.C. and then to supply it in a correct phase relation to the several excitation coils in the main generator so that the layer of magnetizable permanent magnet material in each of the associated rotor cores is magnetized into a desired precise pattern of north and south magnetic poles, each having a desired magnetic flux density. When so magnetized the rotating layer then generates in the portion of the stator winding in its area of influence an A.C. potential of the precise selected frequency while the total voltage generated in the power windings in all of the several stator cores will be the output voltage desired. For very exact and close voltage control, the excitation coils in two of the three cores can be easily controlled to have the A.C. potential phase shift with respect to the other coil so that one lags and the other leads by a similar amount with respect to the A.C. phase in the excitation coil of the third core. The power winding will then, in effect, vectorially add the three slightly out of phase A.C. potentials which are otherwise exactly at the same frequency and reduce the total voltage a small, but precisely controlled, amount from the voltage value generated as if all three were in exact phase.

As described, there are three separate stator cores in a three phase machine, for example, each with an individual exciter pole placed 120 mechanical degrees from the location of the exciter poles in the adjacent stacks. However, the output windings are wound continuously through all three stator cores. This causes the output voltages from each phase to remain displaced 120 electrical degrees from each other at all normal operating speeds.

For most applications, the frequency of the A.C. power derived from the utility line or other power source is also the desired A.C. frequency of the generator output. In the United States and Canada, for example, nearly all the public utility power is of 60 Hz frequency. Computers, robotic devices, machine controls, modern communication equipment, television equipment, and the like used in these countries are designed to function with 60 Hz A.C. Therefore, in these countries the generator of this invention will be programmed to produce 60 Hz constant frequency A.C. In most of the European countries the A.C. produced by the public utilities is of a 50 Hz frequency, and most of the electronic and electrical equipment used there is designed to function with 50 Hz A.C. power.

The rotor of the motor-generator of the present invention will operate very satisfactorily when supplied with either 50 Hz or 60 Hz A.C. power, and a 2 pole motor will reach a synchronous speed of 3000 RPM with 50 Hz A.C. power supply or attain 3600 RPM with 60 Hz A.C. power supply. Only a minor change of the electronic controls need be made to supply the proper frequency of A.C. to the generator excitation coils so that the excitation coils magnetize the layer of magnetizable permanent magnetic material into a pattern such that the generator windings will produce a precise 60 Hz or 50 Hz A.C. output.

Several benefits result when the motor and generator rotor revolve at synchronous speed. Once synchronous speed is reached, the pattern of the north and south poles in the three layers of permanent magnetic material in the generator is constant and need not be changed or modified under normal circumstances. Therefore, the A.C. power to the excitation coils in the generator can be turned off completely. However, in order to compensate for rotor field change due to sudden generator load shifts or changes in the line A.C. frequency, and also to obviate "hunting" which can occur when the load on the generator changes or line frequency changes, the A.C. power to the excitation coils can be turned on briefly at timed intervals. For instance, it can be turned on for a complete revolution or two of the rotor, and then turned off for 5 to 10 revolutions. Also, the excitation coils may be energized by a signal from the voltage regulation controls of the machine indicating that a large load change has occurred or is occurring. Means to accomplish this intermittent excitation are provided in the electronic controls of the generator.

DETAILED DESCRIPTION OF INVENTION

Figure 1:
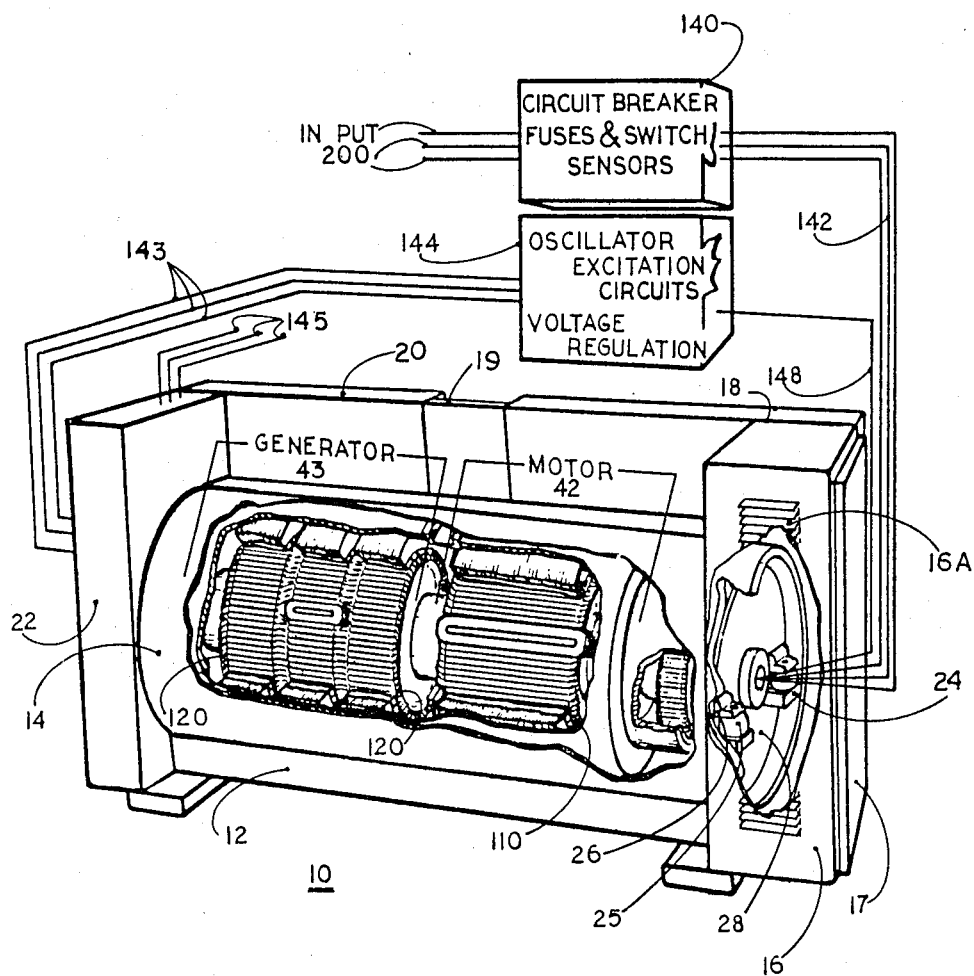
FIG. 1 is a rear perspective view, partially broken, of a motor generator NIPS unit and a schematic block diagram of the electrical circuits thereto.
Figure 2:
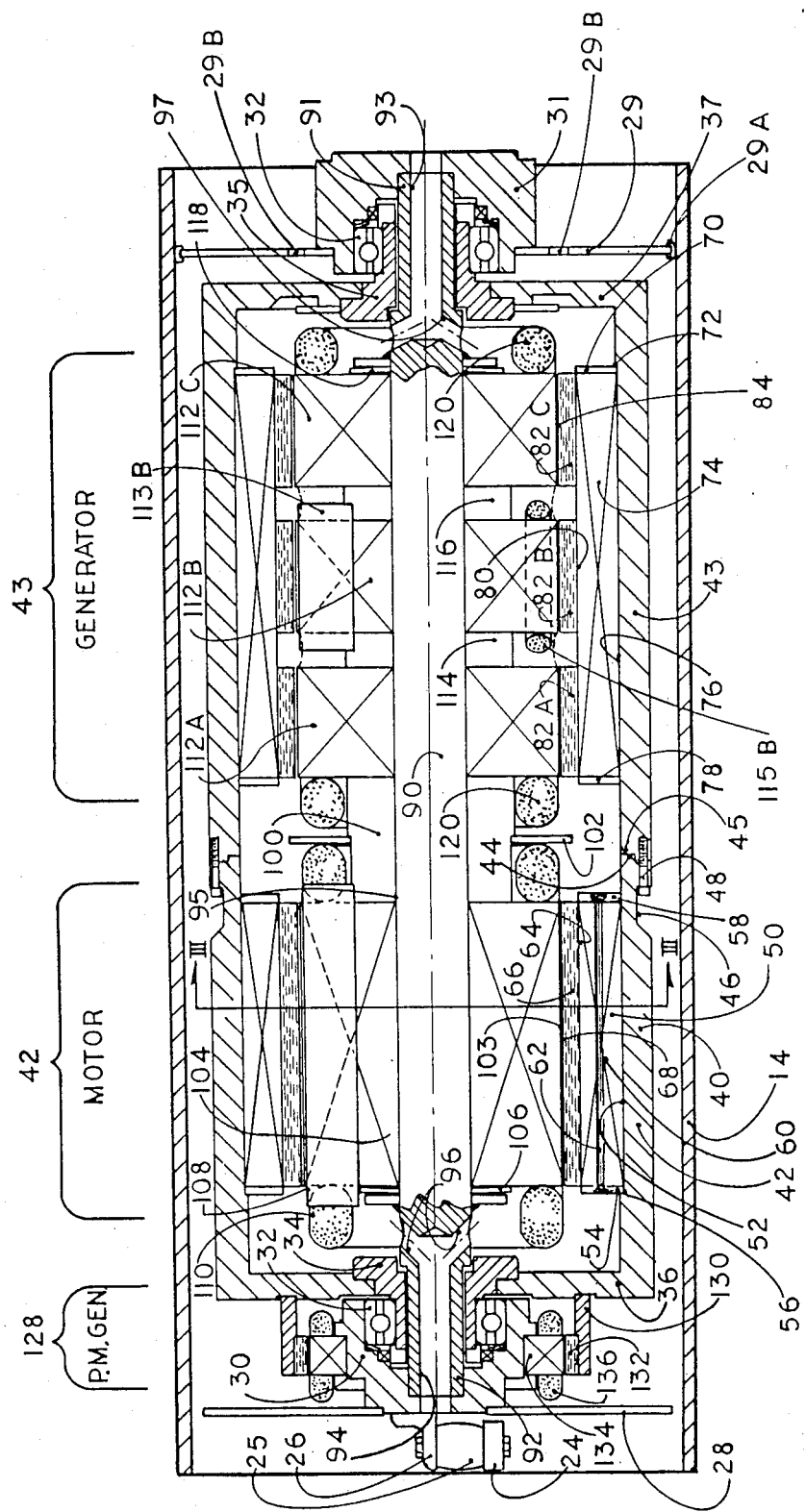
FIG. 2 is a frontal vertical sectional view showing the detailed internal structure of the motor generator proper of FIG. 1.

Referring to FIG. 1 of the drawing, there is shown in perspective a rear view, in partially broken section, of a motor-generator NIPS unit 10 emboding the invention, while FIG. 2 shows more of the details of the motor-generator itself. The unit 10 comprises a supporting base 12 to which is attached a heavy, open-ended horizontally disposed cylindrical casing 14 in which is housed the motor-generator itself which comprises a motor at the right and the generator at the left as seen in FIG. 1. A series of cabinets 16, 18, 20 and 22, each with a hinged door, door 17 for cabinet 16 being shown in FIG. 1, to provide access to the interior thereof, and a control panel 19, having push button controls and signal lamps, are disposed upon the base 12 at the front and on both ends of the cylindrical casing 14. Within these four cabinets are located panel boards mounting the circuit breakers, switches, fuses, control means for both the motor and the generator, and the necessary leads and other wiring, with access ducts for wiring between the cabinets louvers 16A are provided in the cabinet 16 and louvers in cabinet 18 are so arranged as to admit cooling air into the cabinet 18 and then circulated internally so that the cooling air is circulated through the control cabinets, motor and generator, and louvers 16A in cabinet 16 enable the exhausting of the heated air.

Resilient and shock-absorbing support means for the motor-generator unit proper within casing 14 are provided by pairs of opposed heavy brackets 24 detachably fastened by machine screws near each end of the casing 14. Upon each of these brackets are placed pads or grommets 25 of an elastomeric material, and resting on each of these pads is a lug 26, all being held in place by a bolt and nut means, for example, passing through each bracket, pad and lug while allowing small elastic movements between the lugs and the brackets. As seen in more detail in FIG. 2, a pair of the lugs 26 is present at each end of casing 14, each lug of one pair being welded, bolted or otherwise attached firmly to a circular plate 28 adjacent the motor section and each lug of the other pair being attached to a circular plate 29 adjacent the generator section, both plates having a substantial clearance about their periphery with respect to the walls of casing 14. The two plates 28 and 29 support the entire weight of the motor and generator proper and therefore they, as well as the lugs and brackets, should be designed to adequately support this weight. While the casing 14 is shown as being of a circular cylindrical cross-section, it may be of other cross-sectional shape, and it should allow the motor-generator proper with the attached end plates 28 and 29 to be slidably movable in and out of it as may be required for assembly, installation, and maintainance of the motor-generator.

The supporting plate 29 is sealed around its periphery by a flexible diaphragm or a soft seal 29A. Plate 29 has perforations 29B to allow cooling air to flow therethrough. A substantial clearance space between the periphery of plate 28 and shell 14 allows the cooling air to pass by. The plates 28 and 29 are each also provided with a large central aperture through which at least a portion of bearing housings 30 and 31, respectively, may project or at least are accessible. Each of the bearing housings, 30 and 31 has a flat face fitting against its adjacent plates 28 and 29, and such housing is detachably fastened thereto by machine screws. Within the bearing housings 30 and 31 are located ball bearings 32, or other anti-friction bearings, with one race non-rotatably fixed to its bearing housing, the outer race being axially slidably installed as seen in FIG. 2 to accomodate for thermal expansion. Within the inner or movable ball race of the bearing 32 at the motor section is attached a hub member 34 affixed to a flat heavy circular disk 36 while the bearing 32 at the generator section is attached a hub member 35 affixed to a flat heavy circular disk 37.

The peripheries of disks 36 and 37 are welded, bolted or otherwise fastened to the ends of a heavy walled rotatable circular cylindrical shell 40 within which shell are located and affixed to the inside walls thereof the motor and generator rotor components to provide a common rotor having a high rotational inertia. For ease in manufacturing, assembly and balancing of the rotor, the shell 40 is preferably comprised of a separate motor section 42 and a generator section 43, which sections are joined by suitable fasting means into a rigid assembly encircling the motor stator and generator stator. However, the shell 40 can be made as a single cylindrical shell open at at least one end, particularly for units of smaller power ratings.

To join the sections 42 and 43 so as to provide a unitary rotor shell 40, there are several techniques available. Using one technique the sections 42 and 43 are machined to provide complementary or mating circumferential faces 44 and 45, respectively, and, as best shown in FIG. 2, a deep external channel or groove 46 is machined into the peripheral circumference of section 42 near meeting face 44 and a plurality of holes for machine screws are drilled from the face 44 through the shoulder formed by the groove. Alignable threaded holes are provided in meeting face 45, so that machine screws may be applied into the groove 46 and through the drilled holes to threadedly engage the alignable holes in section 43 and thus produce a rigid assembled unitary rotor 40. Alternatively, a circular band having a U-shaped cross-section may be employed to join sections 42 and 43, holes being drilled through the two shoulders of the U-shape to enable machine screws to engage threaded holes in the meeting faces 45 and 46 of sections 42 and 43. While sections 42 and 43 preferably have the same outside diameter, one or the other may be of a greater diameter, or the entire rotor may be slightly coned to enable a larger diameter motor, for example, to be placed in the larger diameter section. A rotor of uniform outside and inside diameters has functioned well, since it is characterized by low windage resistance, and has a very low noise level.

Referring to the motor section 42, the motor components of the rotor are applied by introducing from meeting face 44 and sliding inwardly an annular core 50, comprising insulated laminations of 3% to 5% silicon steel, for example, or other high permeability soft magnetic material, the core being pushed along an inner diameter wall 52 until one face of the core fits against an annular stop ring 54 abutting a shoulder 56 machined into wall 52. The core is pushed in under pressure to seat firmly and non-rotatably against stop ring 54 by applying pressure through a clamping ring 58 and the periphery of ring 58 is welded or otherwise affixed to the inner wall 52. The core 50 has a circumferential ring of perforations 60 passing axially completely through the core 50 from one face to the other and buried shorted conductors 62 are disposed in these perforations. Depending on motor characteristics desired, the shorted conductors 62 may comprise aluminum die cast through all the perforations or uninsulated rods of copper, copper base alloy, aluminum alloy, steel or other similar material, which rods are joined, brazed, or welded at their ends. The buried conductors 62 are preferably uniformly spaced throughout the core.

The inner surface 64 of core 50 is of a circular cylindrical shape and upon it is affixed a layer 66 of magnetizable permanent magnetic material having a high electrical resistance. Suitable permanent magnetic materials are ferrites, such as barium ferrites, barium strontium ferrite and strontium ferrite, or powdered alnico in an insulating resinous binder. The layer 66 can comprise a plurality of bars of rectangular cross-section extending from one core face to the other, or arcuate segments extending from one face to the other face of the core, and having a radial thickness of from about 0.2 to 1 inch (0.5 to 2.5 cm.). In some instances a complete preformed cylindrial shell of permanent magnetic material may be provided. These pieces, bars, or segments of permanent magnetic material are adhesively bonded to each other and to the surface 64 with an epoxy or silicone resin or other suitable strong resinous binder.

It will be observed that there is a substantial radial space separating the bottom of layer 66 at surface 64 from the buried shorted conductors 62, in order to provide a low reluctance path for magnetic flux emanating from the back surface of the magnetic material. The outer or exposed surface 68 of layer 66 is of a circular cylindrical shape coaxial with the axis of rotation of rotor 40.

In the generator section 43 of the shell 40, an inner clamping ring 70 is placed against a shoulder 72 and a generator rotor core 74 comprising an annular stack of insulated laminations of a high permeability soft magnetic material, for example 3% to 5% silicon steel, is introduced from meeting face 45 and slid along the inside wall 76 and the one core face is pressed against the clamping ring 70. Substantial pressure is applied against an outer clamping ring 78 applied to the other core face, and while under such pressure the clamping ring 78 is welded, or otherwise affixed, to the wall 76 so as to retain the core immovably in position within the section 43. Both cores 50 and 74 fit closely to the walls 52 and 76, respectively.

The inner face 80 of core 74 is of circular cylindrical shape and applied thereto is one or more layers of magnetizable permanent magnetic material, there being a separate layer for each phase of desired A.C. output. This permanent magnetic material may be similar to that used for layer 66 and may be similarly prepared and adhesively bonded to surface 80. As shown in FIG. 2, there are three layers 82A, 82B, and 82C for a 3 phase generator. If desired, there may be three separate cores of soft magnetic material, instead of a single core stack 74, one under each of layers 82A, 82B, and 82C. The exposed surfaces 84 of the layers 82A, 82B, and 82C are of substantially circular cylindrical shape, coaxial with the axis of rotation of shell 40.

The support means for the stators of the motor and generator comprise a fixed and non-rotatable supporting shaft 90 having a smaller diameter stub end 91 beginning slightly beyond and projecting outwardly from the generator section 43, and a smaller diameter stub end 92 beginning slightly beyond the motor section 42 and also extending outwardly. The generator stub end 91 extends through an aperture in bushing 35 with a rotational clearance therebetween, and is detachably attached to the walls of bearing housing 31 so that it is non-rotatably supported thereon. Similarly, the motor stub end 92 extends through an aperture in bushing 34, with a rotational clearance therebetween, and is detachably and non-rotatably affixed to the bearing housing 30. Into the external faces of the stub ends 91 and 92 are drilled axial bores 93 and 94, respectively, up to the point where the larger diameter central shaft portion 95 is present in the shaft 90, and one or more smaller entry ports 96 and 97 are drilled, preferably at an angle, from the external surface of the portion 95 to intersect the bores 93 and 94 to allow electrical conductors, control leads, and other wiring to enter from the exterior to the electrical components of the motor and generator stators.

At about the diametral position where the meeting faces 44 and 45 on the shell 40 are located with respect to the shaft 90, there is immovably affixed upon the larger diameter surface portion 95 a spacer block 100. The block 100 may comprise a steel collar with a central bore very close to the diameter at 95 and is welded or otherwise suitably affixed at this location onto surface 95. The spacer block 100 may be in the form of a circular annular ring, or it may be of a hexagonal or rectangular outer shape, or several flats may be milled in the circular ring so as to provide a clearance space to accomodate winding end turns. A shield 102 having an outer edge located at about the radius of the layers 66 and 84a, may be welded at about the mid point of the outer periphery of the block 100 to provide for an electrical and magnetic barrier between the motor and generator sections.

A slotted motor stator core 104 composed of a low eddy current stack of insulated laminations of a high permeability soft magnetic metal such as 3% or 5% silicon steel, provided with a central bore equal to or just slightly greater than the large diameter portion 95 of shaft 90 is pressed onto the shaft from the left, as seen in FIG. 2, until it meets the one face of the fixed spacer block 100. A Belleville washer 106, or outwardly dished ring of spring steel with a central bore slightly greater than the shaft diamemter at 95 is applied to the outer face 108 of core 104 and pressure applied to the center portion of the washer 106 by a hydraulic press or other compressing means until the center of the washer almost meets the face 108. A pressure in the order of several thousand pounds is applied to core 104 for motors of 10 to 20 KW rating. The center of the washer, or of a second heavy steel retainer ring which is applied to the outside face of the washer, is welded to the shaft surface 95 while maintaining such pressure. When the compressing means is released, this compressed Belleville washer places the shaft 90 under tension, which is desirable for reducing noise and vibration. Windings 110, shown schematically in FIG. 1 and FIG. 2, are then placed in the slots in core 104, and, as will be detailed in connection with FIG. 3, several different windings are disposed in these slots. The outer peripheral surface 103 of core 104 is juxtaposed and substantially coextensive with surface 68 of the layer 66, with a rotational clearance therebetween. The slots in the core 104 may be slightly skewed if desired.

Figure 3:
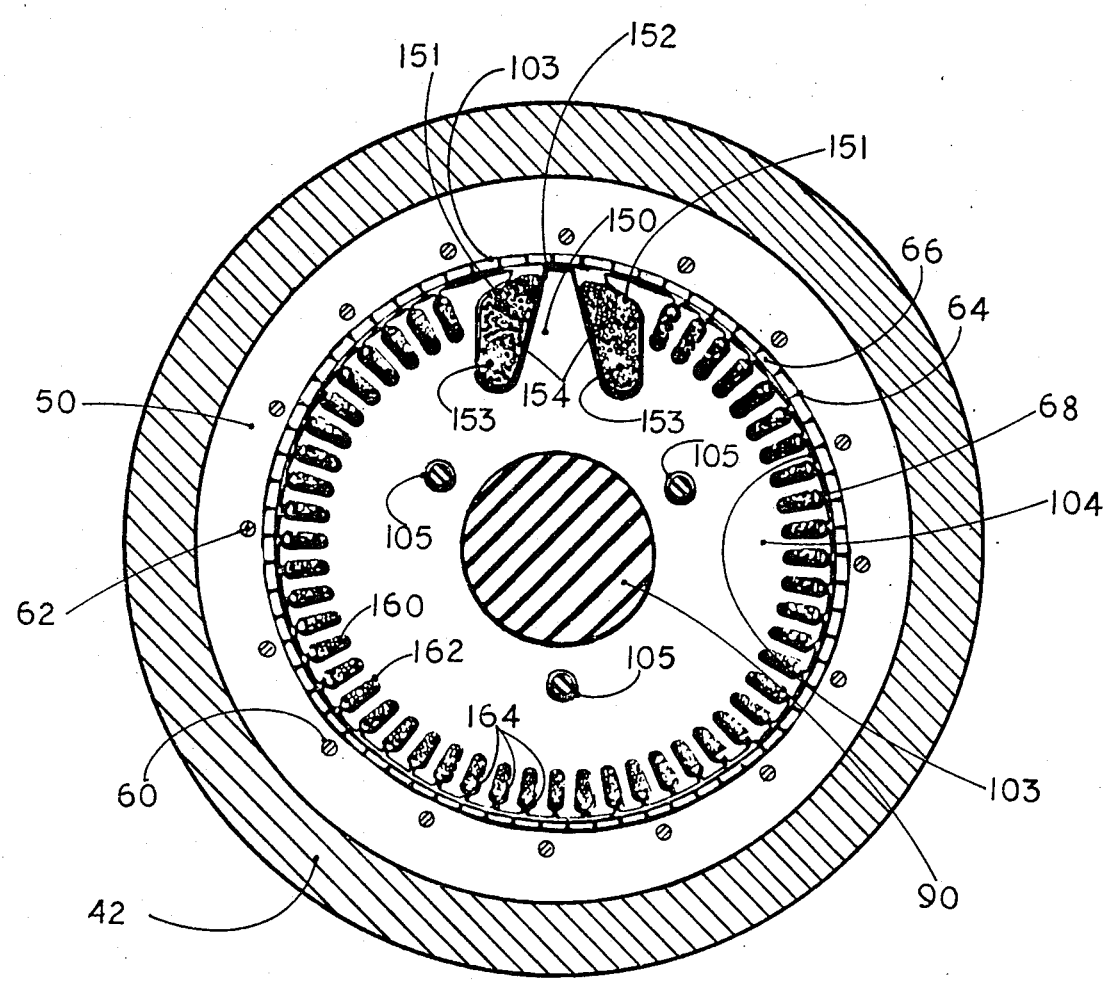
FIG. 3 is a vertical cross-section of the motor on line III—III of FIG. 2.

As best seen in FIG. 3, the slots of core 104 of the motor stator comprise two large slots 151 disposed about a cone-shaped core portion 150 formed by adjacent slot walls 154 tapering at the outer periphery 103 to a narrow pole piece 152 and in these slots is placed an excitation coil 153 which is energizable with single phase A.C. whereby the cone-shaped portion 150 functions as a pole piece having a narrow magnetizing pole piece or pole tip 152 that is alternately magnetized into strong successive north and south magnetic polarity and thus the tip 152 magnetizes layer 66 of magnetizable permanent magnet material into a desired pattern of north and south magnetic poles having a desired magnitude of magnetic flux strength. The remainder of the peripheral surface of stator core 104 contains smaller slots 160 in which are disposed power windings 162 in known manner so that when energized with A.C. from a power source they produce a rotating magnetic field. The rotating magnetic field interacts with the magnetized layer 66 and the shorted turns 62 to produce a powerful rotational torque so as to bring the rotor up to synchronous speed even when the rotor is heavily loaded.

In order to provide a source of single phase A.C. for the excitation coil 153, motor feedback windings 164 are disposed in selected slots in core 104 so that the magnetic flux of rotating layer 66 as it sweeps by will generate therein an A.C. potential of a selected magnitude, frequency, and phase relation to the A.C. from the power source. Concurrently, the magnetic flux of layer 66 as it sweeps by the excitation coil 153 generates an A.C. potential therein, and resonant circuit means are provided to convey the A.C. from the motor feedback windings 164 to the excitation coil and so combine it with the A.C. of the excitation coil 153 to produce a combined single phase A.C. of the desired frequency and magnitude to magnetize the layer 66 into a pattern of north and south magnetic poles substantially optimally reacting with the rotating magnetic field produced by coils 162. Thus no external A.C. need be supplied to the excitation coil. This feedback coil means to generate the single phase A.C. needed for the excitation coil is prefered. However, as taught in co-pending U.S. applicaton Ser. No. 06/679,834, now U.S. Pat. No. 4,600,873, A.C. from other sources may be supplied to the excitation coil, at least in part.

As evident from FIG. 2, the A.C. generator stator comprises one or more cores, there being a plurality of cores, one for each phase of a polyphase generator, three cores are specifically shown in FIGS. 1 and 2 for a 3 phase generator. Three slotted laminated cores 112A, 112B, and 112C, of low eddy current, high permeability soft magnetic material, with interposed spacers 114 and 116 of steel, for example, all with central bores equal to or slightly greater than the full shaft diameter 95 are slid until the core 112A meets the face of spacer block 100 and a closely fitting Belleville washer 118 of tempered spring steel, or an outwardly dished resilient spring steel plate, is applied over the shaft and pressed upon the outer face of core 112C with sufficient pressure to almost flatten the dished out center of the washer 118 which washer is then welded while so compressed about the center aperture to the shaft, as was similarly described with respect to washer 106, so as to put the shaft at the generator section 43 under tension and the cores 112A, 112B, and 112C under pressure. The pressure applied by the Bellville washers 106 and 118 not only maintains the motor and generator stator cores tightly in place, but also reduces vibration and noise. The outer surfaces of the cores 112A, 112B, and 112C are of circular cylindrical shape complementary to the surfaces 84 of the layers 82A, 82B, and 82C, being juxtaposed and substantially coextensive with each other and have a rotational clearance space therebetween, and all being coaxial with the axis of rotor shell 40.

Windings 120 in the generator stator cores are shown schematically in FIGS. 1 and 2. The generator stator laminations, the slot configurations, and the types of windings therein will be closely similar to those in the motor stator as seen in FIG. 3. Briefly, in each core 112A, 112B, and 112C, there are two adjacent large slots on either side of a tapered magnetic core portion which latter forms a pole piece. Into each of these large slots is placed an excitation coil. In core 112B, for example, is shown an excitation coil 113B, which when energized with single phase A.C. will magnetize through its pole piece the adjacent layer 82B of magnetizable permanent magnetic material, as the rotor revolves, into a selected pattern of north and south magnetic poles of a desired magnetic flux density. Cores 112A and 112C also have excitation coils 113A and 113C, respectively (not shown), placed 120 degrees apart as viewed along the axis.

The remaining slots in each stator core 112A, 112B, and 112C are smaller and in them are disposed turns of power windings 120 comprising, for example, enameled copper wire, which will generate A.C. when the magnetic flux from the magnetized layers 82A, 82B, and 82C sweeps by. These windings 120 are preferably so placed in the smaller slots that each turn is laid in all three cores 112A, 112B, and 112C at the same time, the end turns being formed only at the outside face of cores 112A and 112C. This not only simplifies and speeds up the laying of the windings, but also reduces the amount of copper which would be required if each core was separately wound. More importantly, when the same power windings pass through all three stator cores, each receives, substantially, a third of its total A.C. potential from each of the three cores, and voltage adjustments can be readily and easily made by varying the magnitude of the A.C. in one or more of the excitation coils to control the density of the magnetic flux pattern of the north and south poles in each layer 82A, 82B, and 82C. More precise voltage control of the total A.C. power winding output can be further obtained by phase shifting the A.C. in two of the excitation coils with respect to the third excitation coil, whereby one A.C. phase leads and the other lags, so that the total voltage generated can be reduced in closely controlled amounts in the two of the A.C. power windings, and thus reduce the total integrated A.C. output in the windings. The A.C. output leads of the A.C. generator proceed from the outer face of core 112C directly past the washer 118 and into the ports 97 and through the bore 93 to a control switch in cabinet 22 and from there the A.C. generated is conveyed to the sensitive load.

Figure 5:
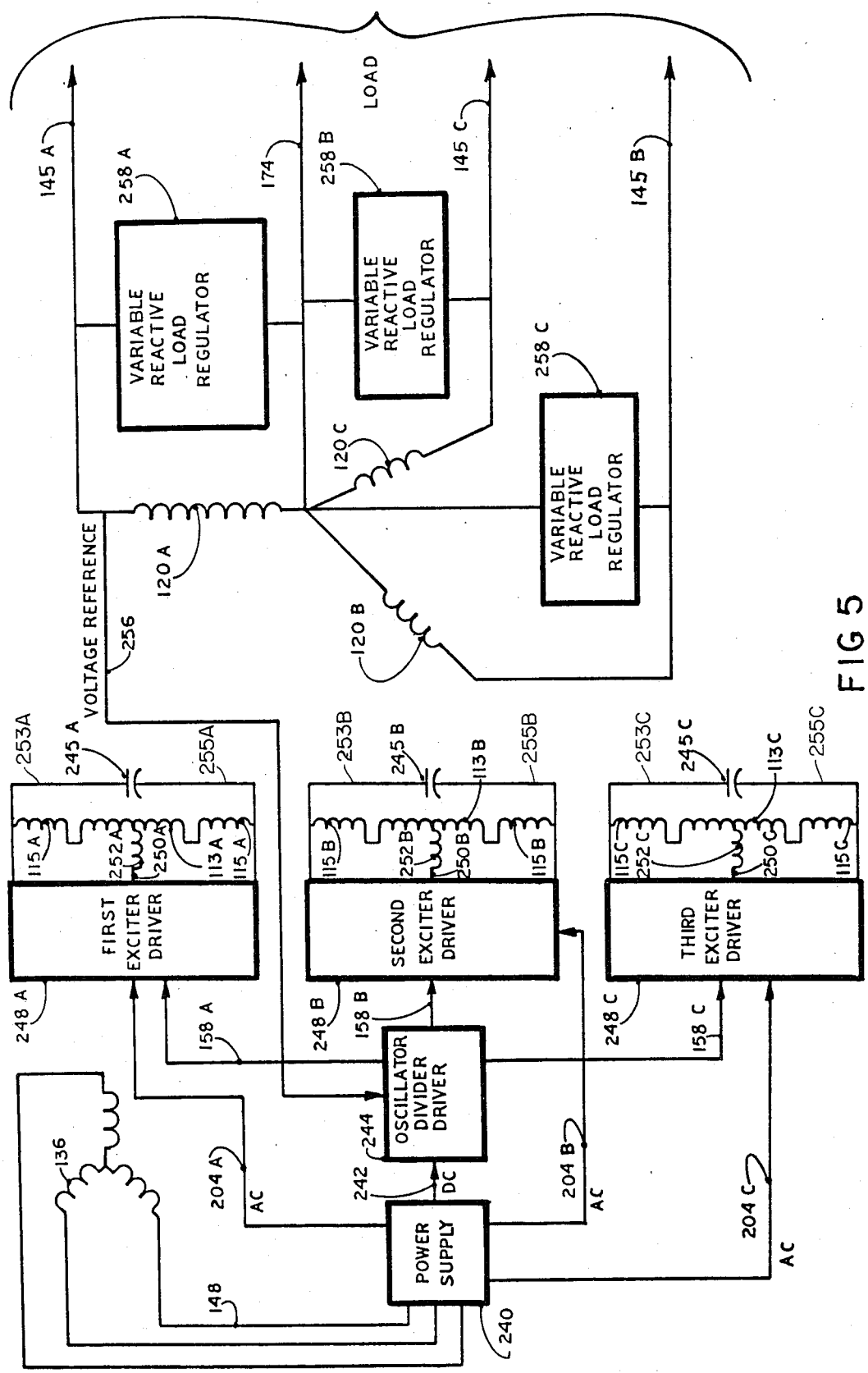
FIG. 5 is a block electrical circuit diagram for a control circuit for the generator.

The windings in each of the generator core stators 112A, 112B, and 112C, also include separate feedback windings 115A, 115B, and 115C (only 1158 being shown in FIG. 2) in selected slots. All three feedback windings are shown in FIG. 5. These feedback windings generate A.C. potential when the flux from their respective magnetized layers 82A, 82B, and 82C sweeps by, the potential being of a selected magnitude and frequency and phase relation. Concurrently, the magnetic flux in the layers of magnetized magnetic material also generates an A.C. potential in each excitation coil 113A, 113B, and 113C. Circuit means are provided to so convey the A.C. potential from each feedback winding to the excitation coil in its core, such that when the rotor 40 is revolving at synchronous speed the A.C. potential generated in each of the excitation coils is substantially suppressed thereby, and only single phase A.C. of a desired controlled frequency and magnitude from the control means is effectively energizing each excitation coil. However, at speeds below or above synchronous speed, the A.C. potential from the feedback windings beneficially supplements the single phase A.C. from the control means energizing each excitation coil so as to produce an optimum magnetizing pattern of the layers 82A, 82B, and 82C whereby the A.C. potential being generated in the power windings is of substantially the desired voltage and frequency.

In order to provide an auxilliary supply of A.C. power for energizing the controls in the main A.C. generator, there is provided a small permanent magnet (PM) generator 128 for producing a higher frequency A.C. than normally desired from the main A.C. generator in section 43, the PM generator 128 preferably being located at the outside face of the plate 36. The rotor of the PM generator comprises a short circular ring 130 of slightly smaller diameter than shell 40, and which can either be detachably fastened to or be an intergral part of the outer face of plate 36. Within the inside periphery of the ring 130 is cemented a layer 132 of permanent magnets for example, barium strontium ferrite, of fixed polarity arranged so as to provide a succession of alternate north and south magnetic poles. Attached to the stationary bearing housing 30 is the PM generator stator comprising a narrow annular slotted stack 134 of laminations of high permeability soft magnetic material juxtaposed with layer 132, detachably clamped to the housing, and in the slots are placed windings 136 in which A.C. potential is generated when the magnetized layer 132 sweeps by. The frequency of the A.C. generated in the windings 136 desirably may be 600 Hz, while the main A.C. generator is producing 60 Hz; while in a unit where the main generator is producing 50 Hz A.C., the PM generator 128 would in this instance generate 500 Hz. The range of higher frequencies from PM generator 128 may be from 100 Hz to over 1000 Hz.

The controls for the motor are housed in cabinet 16 and comprise circuit breakers, fuses, switches and sensors, shown in block diagram form 140 in FIG. 1, with leads 142 entering bore 94. In cabinets 18 and 20 are located the generator controls shown in a block diagram 144 in FIG. 1, whose electrical leads 143 pass to cabinet 22 and thence into bore 93 and thence via port 97 to the generator stator. Leads 148 from the PM generator 128 pass through plate 28 and convey higher frequency A.C. to the control means in 144. Push buttons, or other control switches on panel 19 are manually operable to start the motor and bring it up to synchronous speed. Upon attaining operating speed, a generator output contactor is activated either manually or automatically to supply the A.C. generated through leads 145 to the load. Ammeters, voltmeters, control signals, warning lights, and rotor speed indicators and the like may be present on the panel 19.

Figure 4:
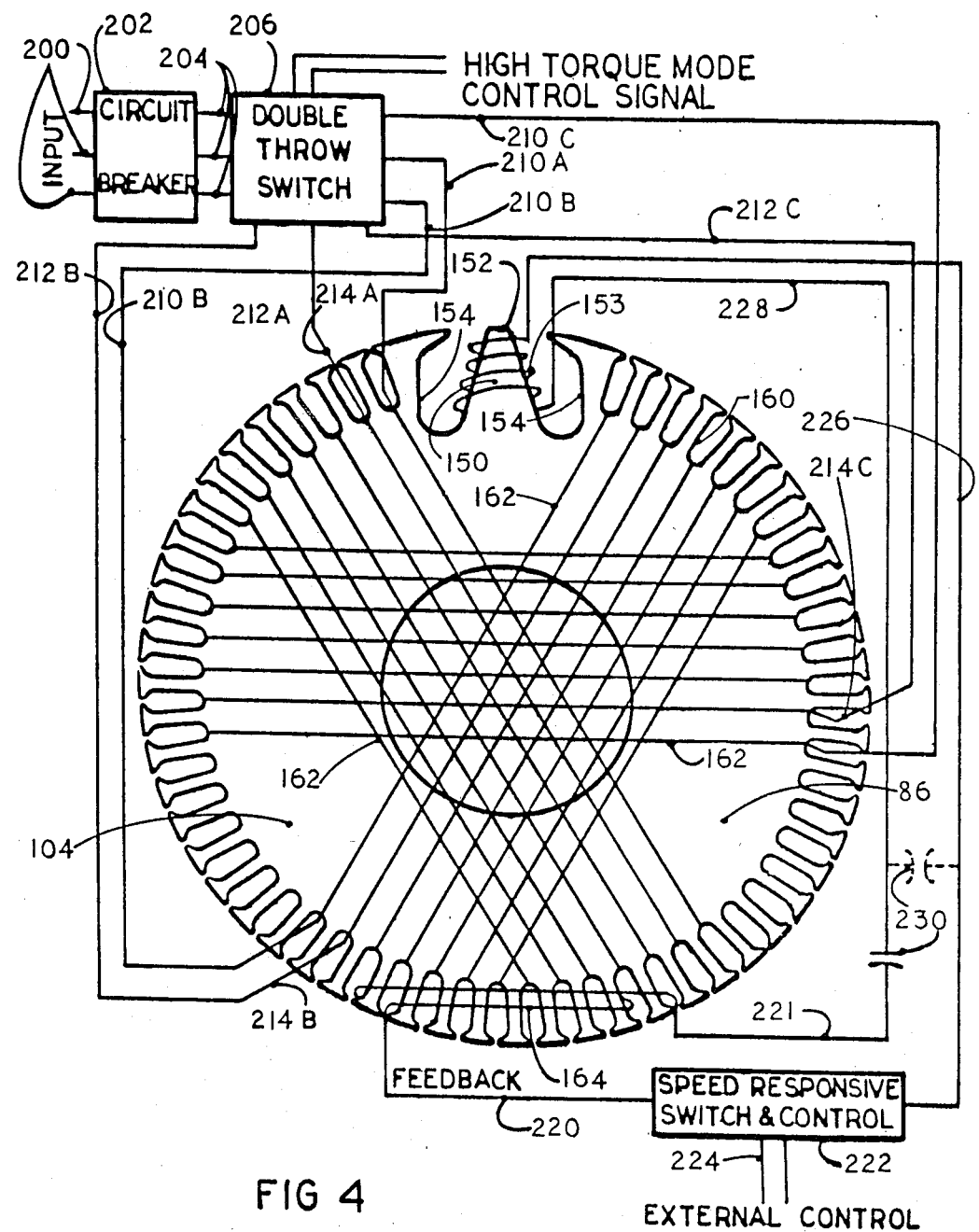
FIG. 4 is a schematic plan view and electrical circuit diagram for the motor.

Referring to FIG. 4 of the drawing, there is illustrated a schematic circuit diagram of the electrical operating and control means for the synchronous motor in motor section 42, particularly showing the circuitry to the stator windings and including a desirable modification of the stator windings. Outside power line 200, shown as a 3 phase input line, enters the circuit breaker unit 202, which is housed in cabinet 16, wherein there may be not only the circuit breaker elements, but also associated lightning arrestors, fuses, and other safety and control components. From the circuit breaker unit 202, three conductors 203 enter a tap changing double throw switch 206, wherein each line may energize one blade of a three bladed switch. The tap changer switch 206 may be a contactor incorporated in the circuit breaker assembly 202, or it may be a separate switch operable manually, or by a soleniod, or by a rotor speed responsive actuator. To start the motor from standstill under normal torque load, the switch 206 is positioned from a full open position until it reaches a position where each blade or contact engages one of the contacts connected to leads 210A, 210B, and 210C, respectively, to convey A.C. potential to the end terminals on the respective coils forming windings 162, so that the full coils are energized and the full impedence of each is effective. The A.C. amperage drawn by a given line is determined by such coil impedence, and such current results in a rotating magnetic field of a given magnitude which will produce a specific rotating torque reaction effective to start the rotor turning and to accelerate. This energizing of the full windings is designated the "normal mode" for the motor.

There are times when a higher rotating torque is desired than is available in the normal mode, as for example in accelerating the motor from an intermediate speed to its full synchronous speed. When such higher torque is desired the tap changing switch 206 may be operated, first, to disconnect the blades or contacts from leads 210A, 210B, and 210C, and then to effect electrical contact to lines 212A, 212B, and 212C which convey the line A.C. potential to taps 214A, 214B, and 214C, respectively, on the coils forming the windings 162. The taps convey the A.C. potential only to a shortened number of turns in each of the coils, whereby a lesser coil impedence is effective and thus for the same A.C. line potential a substantially greater amperage energizes the windings 162, thereby increasing the magnetic flux in the rotating magnetic field and immediately increasing the torque on the rotor. In practice the torque has been increased from 2 to 3 fold depending on the tap location. This is designated as the "acceleration mode" for the motor.

As shown in FIG. 4, the feedback windings 164 are connected to the excitation coil 153, through a capacitive resonant circuit in which a lead 220 from a first terminal thereof is connected to a speed responsive switch and control unit 222, an output lead 226 from the unit 222 is connected to one terminal of the excitation coil 153, and a lead 228 from the other terminal of the excitation coil is connected to one terminal of a capacitor 230, while a lead 221 connects the second terminal from feedback winding 164 to the other terminal of the capacitor 230. For certain applications the capacitor 230 may be connected across leads 226 and 228, as shown in dotted lines, therefore being in parallel with the excitation coil 153 and feedback winding 164. The feedback winding 164 is shown schematically as being located in slots generally diametrically opposite the excitation coil 38. However, in practice the physical location of the feedback winding may be in other slots and such selected location is a function of the particular design and application of the motor.

The operation of the excitation coil circuit is as follows:
When the speed of the rotor reaches roughly 75% to 80% of its synchronous speed, as a result of the torque produced by the rotating magnetic field of the stator reacting with the rotor and particularly by the induced field generated by the shorted conductors 62 which magnetize the rotor core, the speed responsive switch 222 then operates to close the circuit from lead 220 to lead 226 and an A.C. potential from the feedback winding which is generated by the magnetized rotor is carried through the circuit to the terminals of capacitor 230. A.C. is also being concurrently generated in the excitation coil 153 by the magnetic poles in the revolving rotor, such as in layer 66 as well as in the rotor core and the rotating magnetic field of the stator. The resonant circuit combines these several A.C. potentials so that a single phase A.C. current of selected magnitude and phase flows through the excitation coil 153 and produces a strong alternating magnetizing flux at the tip 152 of the pole piece 150 so that selected portions of the magnetic layer 66 are magnetized essentially to a saturation level into a pattern of successive strong north and south magnetic poles. These magnetic poles in layer 66 react strongly with the rotating magnetic field to cause a substantial increase in torque. The rotor will quickly, yet smoothly, increase in speed so that synchronous speed is soon attained, and full load on the rotor can be applied without any difficulty.

The synchronous motor of this invention can be started in either the normal mode or in the acceleration mode, or by applying these modes in sequence, up to the point where roughly 75% to 80% synchronous speed is reached, and then the excitation coil is energized to cause the rotor to continue to accelerate in either mode as desired, at a high torque, to reach synchronous speed.

When the speed responsive switch 222 closes the resonant circuit to the excitation coil, it may be desirable in some applications to concurrently operate the tap changing switch 206 to cause the A.C. power in lines 200 to energize the complete stator windings 162, therefore means, such as a solenoid energized and controlled from switch 222 by signals through line 224, are energized when the 2700 to 2900 RPM point is reached, for a 2 pole 60 Hz motor, and the switch 206 then is positioned so that line A.C. power goes only to leads 210A, 210B, and 210C and thus energizes the full windings 162. In any event, when synchronens rotor speed is reached, the tap changer switch 206 is caused to disconnect power to the low impedence tapped windings and to connect the full windings to the A.C. line power.

It will be understood that the taps 214A, 214B, and 214C and the tap changing switch 206 need not be present nor used in the motor. They are provided primarily to enable the motor to accelerate a heavy or variable load. A particularly desirable situation for the use of the low impedance winding taps on windings 162 is at the time when line voltage is briefly interrupted and the motor starts to lose speed, say slowing down from 3600 RPM to 2900 to 3100 RPM (for a 2 pole 60 Hz motor) and when A.C. line power returns at this rotational speed point line A.C. power is conveyed to the taps 214A, 214B, and 214C so that the rotor will accelerate back to synchronism even under brief over-load conditions.

For an understanding of the operation and control of the generator windings in section 43, reference should be had to FIG. 5, where there is shown suitable circuitry for providing single phase A.C. of a magnitude and of a phase relationship suitable for properly energizing the excitation coils 113A, 113B, and 113C, and means for voltage control of the A.C. power output of the generator. The relatively higher frequency A.C. power generated in windings 136 of the PM generator 128 is carried by leads 148 to control means 144, shown in the block diagram in FIG. 1, which includes a power supply unit 240 where a portion of this A.C. is rectified to provide a direct current which is carried by leads 242 to an oscillator divider driver and phase shift unit 244. Unit 240 also has a series of secondary coils coupled in a transformer relation in which the primaries receive the higher frequency A.C. from line 148 and from three secondary coils coupled therewith, A.C. such secondary potential is carried by leads 204A, 204B, and 204C to exciter driver units 248A, 248B, and 248C, respectively. Each of these exciter driver units converts the high frequency A.C. so received to precise 60 Hz A.C., for example, for a 60 Hz main generator output. Such 60 Hz A.C. is delivered to the first stator, for example, from the first exciter driver 248A by leads 250A through a choke coil 252A to its respective generator excitation coil 113A. Feeding into the same circuit with excitation coil 113A is A.C. potential conveyed from the feedback winding 115A, half to one terminal and half to the other terminal of excitation coil 113A, so that the potential in feedback winding 115A is in general opposition to any potential generated in excitation coil 113A by the sweeping by of the magnetic fields in layer 82A. A capacitor 245A is joined by leads 253A and 255A completing the circuit to the first exciter driver. At synchronous speed the A.C. potential in feedback coil 115A is substantially equal to that generated in the excitation coil 113A by the magnetized layer 82A as it sweeps by. If the rotor is either below or above synchronous speed, the combined A.C. of the feedback coil and that of the excitation coil produces a net A.C. that allows the excitation coils to modify the magnetized layers 82 to compensate for such speed variations. The second and third exciter drivers 248B and 248C similarly control their excitation coils 113B and 113C, respectively.

In operation, the energized excitation coils 113A, 113B, and 113C, magnetize the layers 82A, 82B, and 82C, rspectively, as they rotate, to a desired level of magnetic flux and in a desired pattern of north and south poles, whereby the power generating windings 120A, 120B, and 120C intercept such magnetic flux and generate A.C. of a desired voltage and of the precise frequency of the A.C. energizing the excitation coils. In one embodiment the current supplied to the excitation coils 113A, 113B, and 113C is substantially fixed in magnitude and of sufficient value to drive the magnetic layers 82A, 82B, and 82C to essentially saturation. However, if desired, in order to control the voltage generated in the windings 120A, 120B, and 120C, as shown in FIG. 5 a voltage reference line 256 may be connected to the output winding 145A, for instance, which carries this voltage to the oscillator divider driver 244, wherein the latter responds to generate the desired A.C. control voltage output to the several exciter drivers 248A, 248B, and 248C to provide through leads 250A, 250B, and 250C A.C. the desired voltage to the choke coils 252A, 252B, and 252C, and thence to excitation coils 113A, 113B, and 113C to develop a given magnetic field strength.

To control the voltage output generated in windings 120A, 120B, and 120C, a variable reactive load regulator 258A, 258B, and 258C may be interposed between each line 145A, 145B, and 145C and the neutral conductor 174. Such reactive load regulators may each comprise several reactance coils having a capacity of 20, 40, and 80 millihenries, for example, interposed between line 145A and 174, for example, and voltage sensitive control means may be provided to connect one or more of these reactive coils in a circuit to cause, by armature reaction, an effective drop in the rotating field and thereby reduce the voltage in line 145A. The voltage sensitive means which may be enclosed within units 258A, 258B, and 258C, or external thereto, may include any of well known automatic electronic or electrical switching means responsive to changes in voltage whereby when the voltage exceeds or falls below a given range of voltages, then one or more reactance coils are put in circuit or switched out. Of course, the load regulator can be operated by an operator reading a voltmeter in the output dircuit and manually opening or closing switches to each of the reactive coils. The generated output A.C. voltages can be readily controlled thereby within plus or minus 2%-for instance, in the range of 120 volt output, plus or minus 2.5 volts.

In order to secure the most precise, continuously variable voltage control of the generator's A.C. output, the A.C. potentials generated in those portions of the power windings 120 in the cores 112A and 112B, for instance, are phase shifted to a selected extent with respect to the phase of the A.C. potential being generated in the core 112C. The phase shifting of the A.C. of the winding 120 in core 112A is carried out such as to lag by a given amount, and that of the winding 120 in core 112B leads the phase of the A.C. in the winding 120 in core 112C by a similar amount. The total vectorially intergrated A.C. potentials generated in each winding 120 therefore can be controllably smaller than when there is no phase shifting. Various means may be employed to accomplish the desired phase shifting. One such procedure is to control the phase angle relation of the single phase A.C. being supplied to each of the excitation coils 113A, 113B, and 113C, so that the layers 84A and 84B are magnetized to provide a shifted pattern of the north and south magnetic poles, and these in turn will generate phase shifted A.C. in the portions of windings 120 sweeping by the layers 84A, 84B, and 84C. Electrical and electronic means to accomplish the phase shifting of the excitation coils are set forth in U.S. Pat. No. 4,177,414, and particular reference should be had to the circuitry in FIGS. 5, 7A and 7B and the portions of the specifications relating thereto.

Any of several different electronic means may be provided to control the intervals for supplying of single phase A.C. to the excitation coils of both the motor and generator of the NIPS unit. One suitable means for repeatedly supplying single phase A.C. at intervals to the excitation coils 113 and 153, comprises standard TTL divider chips in an electronic circuit so as to provide a period of time of say, one second, after the motor reaches synchronous speed, where switch 222 in FIG. 4 is activated through line 224 to cause A.C. to flow through circuits 220, 226, 228, and 221 to the excitation coil 153 for about a second, and then the switch 222 is signaled to break this circuit so that no A.C. flows to coil 153 for a longer period of, for instance, 10 seconds, and then this on and off cycle is repeated. Such on periods may be as little as one cycle of a 50 Hz or 60 Hz A.C., to as much as several seconds, while the succeeding off periods may be from 4 to 20 times longer. This results in the use of less energy by the excitation coils and thus the overall efficiency of the unit is improved.

Further, after reaching synchronous speed, there may be occasions when the rotor will "hunt", that is rotate at faster or slower speeds in longer time cycles, than at synchronous speed, such as may be caused by sudden load changes or by changes in the source line frequency. To enable the rotor to cease "hunting" and to return to steady synchronous speed, electronic means using TTL divider chips coupled with frequency sensitive time means, all in an electronic circuit may be provided to energize the excitation coils to counteract the "hunting".

Many varieties of magnetizable permanent magnetic material can be employed in both the motor and generator rotors of this invention. The layers 82A, 82B, and 82C, for example, preferably are comprised of an electrically non-conductive permanent magnetic material such as a ferrite. Metallic permanent magnetic materials, such as the alnico alloys, can be employed, if they are fabricated in such a manner, as by mixing the powdered material with a resinous binder, as to reduce eddy currents therein from the excitation flux to an acceptable level.

Figure 6:
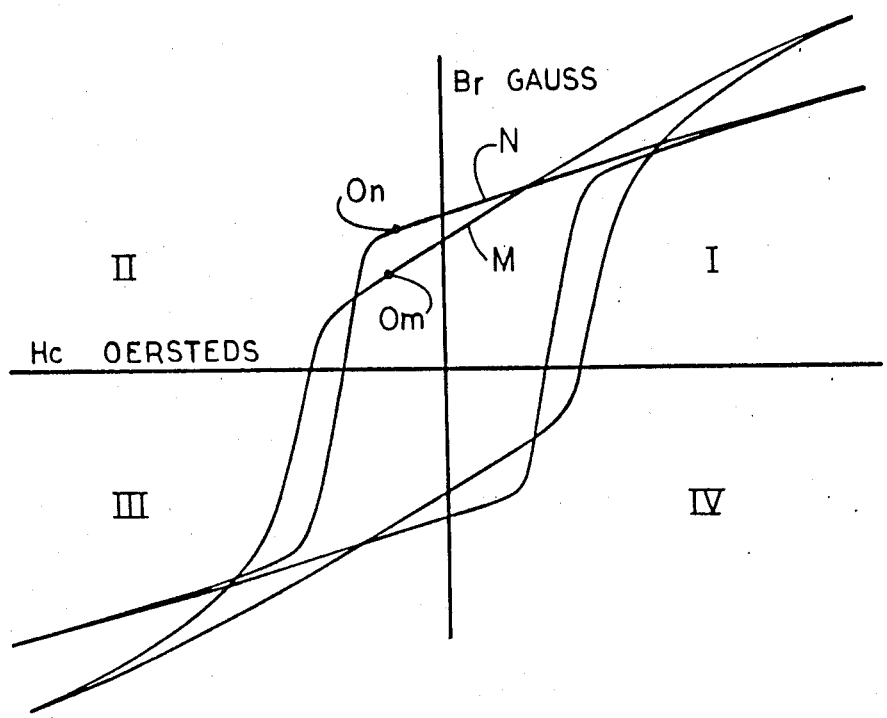
FIG. 6 is a graph plotting the hysteresis loops of two ferrite materials.

Barium ferrites and/or strontium ferrites have given excellent results in the practice of this invention. Newer and improved types of ferrites and similar magnetizable permanent magnetic materials are presently available and are being developed and may be available in the future for use in producing the layers of magnetizable permanent magnetic material. The hysteresis curves of two ferrites that have given good results in test motors and in test generators are shown in FIG. 6. An oriented barium ferrite that has been commercially available for some years, under the trade designation Grade 5 ferrite, was tested in a fixture representative of the magnetic paths in an actual motor by subjecting a 0.33 in. (0.84 cm.) thick sample to a hysteresis loop test wherein a magnetizing force was applied in one direction and then in the opposite direction and the induction in gauss for the samples was plotted against oersteds of magnetizing force. Curve M shows the hysterisis loop for this sample. The closed circuit magnetic parameters for this material are a Br of 4000 gauss and an Hc of 2300 oersteds.

Another available ferrite, designated as S 4109, was similarly tested and exhibited a much squarer and smaller hysteresis loop N. Corresponding closed circuit properties for this latter ferrite are 4100 gauss for Br and 900 oersteds for Hc. Even though this sample was 0.64 in. (1.63 cm.) thick, it required less magnetizing force to reach saturation than does a shorter length sample material of curve M. This allows a thicker layer of a material of a type similar to S 4109 to be employed without expensive or modified exciter components. In a generator of this invention the load that can be delivered at a particular rated voltage is a function of the machine impedance. In A.C. generators this impedance is generally caused from armature reaction. The effect of armature reaction is reduced to ½ if, for example, the ferrite layer thickness is doubled. Therefore, employing a material with characteristics such as in material S-4109, the machine rating can be substantially increased over that which would be required if a more conventional ferrite material such as Grade 5 ferrite was employed.

The second quadrant shape of these curves illustrate this advantage. In the curve M the point Om is a typical working point in the second quadrant. The curve has a steeper slope at this point and a lower value in gauss as compared to point On, and therefore a thicker magnet can be used at the typical working point for material N. At point On material N has about 50% more magnetic strength in gauss than the material M at point Om; also because of the thicker magnet the slope of the curve On is flatter and yields better machine properties than that of material M. The optimum thickness of the ferrite layer, 52 in FIG. 2, or 123 and 124 in FIG. 4, depends on the characteristics of the ferrite or other permanent magnetic material. Thus the ferrite M and other similar ferrites can be applied in layers of about 0.2 to 0.4 inch (about 0.5 to 1.0 cm.) in thickness for motors up to 40 horsepower or generators of 30 KW, and in thicknesses of from about 0.3 to 0.5 inch (about 0.75 to 1.3 cm.) for higher rated motors or generators of comparable higher ratings, while the material of curve N could be used effectively in thicknesses of from about 0.5 to 0.7 inch (about 1.2 to 1.8 cm.) for a 40 horsepower (30 KW) motor or generator of up to 1 inch (2.54 cm.) and more than 1 inch for larger motors and in generators of comparable ratings, for instance for 60 KW and higher. The relative permeability indicated by the slope of the curves M and N at the operating points ON and OM is essentially unity. The use of a thicker magnetic layer effectively increases the magnetic airgap seen by the field from the stator windings and reduces the machine impedance inversly proportionately. Thereby, the use of a magnet material with characteristics illustrated by curve N allows the motor to accept more line current before excessive torque angles are reached and hence deliver significantly more torque from the same size machine. Similarly, since the slope of the second quarter curve effectively determines the machine voltage regulation, improved results have been obtained in generators made using the ferrite material of curve N. The use of the magnetic material described greatly reduces the overall machine size for a given rating.

The ferrite material N has produced outstanding results when employed for layer 66 in the motor and in layers 82A, 82B, and 82C in the generator, and these improved results are due to the fact that the coercive force, Hc in oersteds, has a numerical value that is less than about 45% of the numerical value of the residual induction, B in gauss, of the fully saturated material. Any other ferrite or magnetizable permanent magnetic material having similar properties would be eminently suitable for use in both the motor and the generator of this invention.

While the present invention has become practical and feasible by reason of applicant's novel synchronous motor as described therein, it is foreseeable that other improved synchronous motors, capable of driving the present generator having a high inertia rotor, may be developed and will be available. Accordingly, such synchronous motors may be substituted for the motor described herein to drive the improved efficient generator as shown and disclosed herein.

A motor generator of a construction essentially that shown in FIGS. 1 and 2, of 2 pole configuration, having a nominal rating of 25 horsepower (18.7 KW) with a total rotor inertia of 434 lb-ft squared was energized with 60 Hz, 3 phase A.C. at 208 volts, and tests of current and torque were carried out from standstill to synchronous speed. When the motor was switched onto the power line in the normal mode with the full power windings being energized, the initial current drawn was a maximum of about 106 amperes and it dropped slowly to a lower ampere value by the time the rotor reached a speed of 2800 RPM. The motor starting torque was 30 lb-ft. which remained constant to about the 2800 RPM speed point. At the 2800 RPM speed, the excitation coil was energized with single phase A.C. and the line current drawn immediately dropped to 74 amperes while the torque value rose to about 48 lb-ft. and as the rotor speed increased the amperage values dropped almost linearly to about 46 amperes at the point just before pulling into the synchronous speed of 3600 RPM. At synchronous speed the torque and input current assume the value required by the connected load. In all cases the motor easily and smoothly accelerated to its synchronous speed, even when carrying a substantial load. Even with the high windage losses necessarily associated with this high inertia rotor design, tests indicated that the efficiency of the motor was 91% at the 25 horsepower output level, and the efficiency decreased only very slightly to 89% at 15 horsepower output and 79% when only 7.5 horsepower output load was being applied. For many electrical motors, substantial load output decreases of these proportions usually drastically reduce the efficiency, often to below 60% to 70%.

This same test motor was also energized in an "acceleration" mode, by providing a tap to the stator power windings at a point where only about 75% of the full windings were energized so that the impedance was slightly over 50% of the impedance of the full windings. The initial amperage drawn was about 210 and the initial torque was about 50.3 lb-ft. The torque dropped steadily to 44 lb-ft. at 2800 RPM while the current being drawn dropped to 178 amperes. At 2800 RPM the excitation coil was energized and the torque increased to over 60 lb-ft. and the current dropped to 96 amperes just before the synchronous speed of 3600 RPM was reached.

The test motor was started repeatedly and accelerated in both the normal mode and the acceleration mode to the 2800 RPM speed, then the excitation coil was energized to cause the rotor to reach synchronous speed fully loaded, and then the line power was cut off to simulate a brief line power interruption, the motor being allowed to lose speed down to 3150 RPM, and lower, and at that point full A.C. power was restored. In each instance the motor restarted and accelerated smoothly under load, with no electrical surges, overheating, or other difficulties, and readily reached full synchronous speed each time. Another desirable and valuable characteristic of the motor of this invention is its quietness at all speeds. Noise levels of the 25 H.P. (18.7 KW) motor described are less than 70 db at 1 meter.

The motor-generator NIPS unit using this motor as had a rotor shell containing both a two pole motor and a two pole A.C. generator rotor components, wherein the shell outer diameter was 16.5 inches (41.9 cm.) with walls 1 inch (2.54 cm.) in thickness, and having a total weight of about 1200 pounds (about 545 kg.) with a rotational inertia of 434 lb-ft. squared (13.5 slug-ft. squared), including the rotor laminations and permanent magnet materials. When the motor was supplied with 60 Hz A.C. from a utility power line it was easily brought up to a 3600 synchronous speed in less than 3 minutes and the generator output to a load at this synchronous speed was 3 phase A.C. at 208 volts with 42 amperes being delivered at full load, which could be safely increased to accomodate substantial overloads of 60 amperes or more for periods of some minutes in duration.

Tests were conducted in which the line A.C. power to the motor was interrupted by opening the circuit breakers, and the A.C. generator component continued to supply an unbroken A.C. output of 60 Hz A.C. without any significant change at the specified voltage to the full load by converting the rotational energy of the rotor between the 3600 RPM and the 3150 RPM levels, the latter being deemed a practical low speed at which the full output power could be delivered and voltage maintained. For the above given weight of rotor, deemed to be of intermediate size and weight, approximately 23% of the rotor's kinetic energy was available in running down to 3150 RPM and the full load was supplied 60 Hz A.C. for some 15 seconds.

Figure 7:
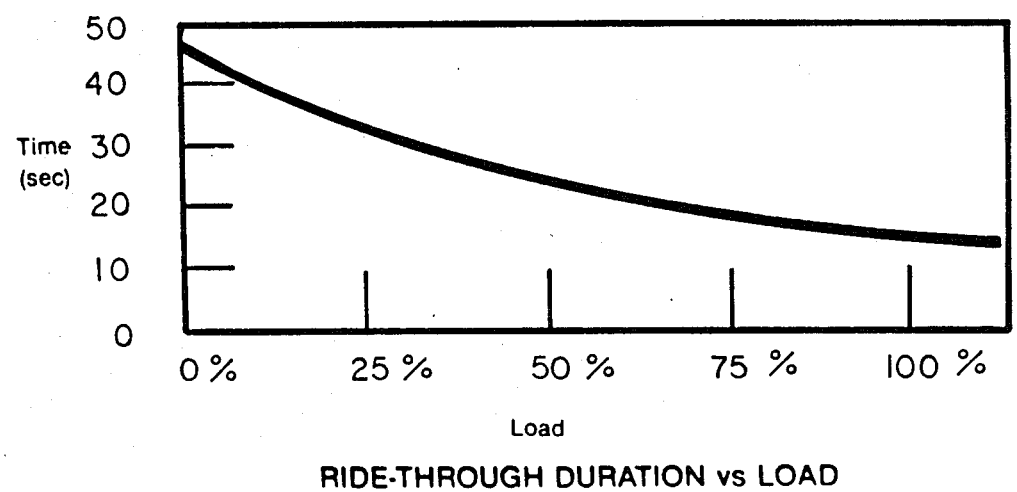
FIG. 7 is a graph plotting ride-through time of the generator for varied size loads.

If less than the normal full load output need be supplied with A.C. from the generator in the event of a power line outage, then the generator will supply such reduced load for periods longer than 15 seconds after the complete power outage. As shown in the curve of FIG. 7, wherein is shown the ride-through time for varying loads, a full load will be supplied for some 15 seconds, and for a longer period for loads of less than 100% of the full load rating of the generator. After a power outage, the generator will supply about 25% of the full load for some 30 seconds, and 50% of the rated load for 23 seconds. Thus, in a practical situation where the NIPS generator is supplying five different loads, each requiring substantially equal A.C. power at full load, and four of the loads are less critical and can be cycled down in a few seconds, while one is involved in a critical operation requiring a longer ride-through time, then the last unit could be fully powered by the generator for at least some 30 seconds.

Where a longer ride-through time of say 30 to 40 seconds at full A.C. output is desired it can be supplied at only a very moderate cost by increasing the rotor shell thickness to provide increased rotational kinetic energy. For example, increasing the shell wall thickness from 1 inch to 2.5 inches (2.54 to 6.4 cm.) can be accomplished easily and at a moderate increase in the price of the unit and the ride through time will be more than doubled. Locating this extra rotational mass on the rotor shell is easily and simply done and is most efficient, and requires less changes in the machine than, for instance, employing an external flywheel, where extra bearings, etc. would be needed. Also being completely self contained, and in a small overall volume, it is both much smaller and quieter than a machine with an external flywheel.

The frequency of the A.C. output from the generator of this invention can be readily maintained at 60 Hz +/− 0.20% both in the steady state and during the ride-through period. The voltage can be regulated very easily within +/− 5% or better of any desired voltage level, both for steady state conditions as well as unbalanced load conditions where unbalance may run up to 100%. The total harmonic distortion of the A.C. output is typically less than 5%.

An important desirable characteristic of the motor-generator NIPS unit of this invention is its unusually low quietness which is about 60 to 65 db-A at 3 feet from the unit. This is due in great part to the motor employed in the unit running at synchronous speed, though the generator is also inherently quieter than the usual A.C. generators. Wind noises are greatly reduced due to the smooth exterior shell of the rotor.

The motor will accept and will operate quite well even when supplied with A.C. power whose voltage may vary from plus 10% to minus 20% of the rated voltage it is designed for.

It will be recognized that very often in association with sensitive loads requiring A.C. of precise constant frequency and constant voltage there are facility and peripheral loads that require A.C. power that need not be of precise frequency and voltage. For example, electronic data processors and computers are normally located in windowless rooms that must be supplied with a high level of illumination, and present are small electrical motors, or equipment that is operated by direct current, produced by rectifying A.C.,powering printers, typewriters, and other units operated by electrical energy. Illumination is particularly critical in such facilities because if a power outage occurs, the room is plunged into complete darkness and the operators will experience great difficulty in shutting down or cycling down the equipment. Also, if a robotic mechanism operated by a computer is in the midst of an operation-for instance, welding or transferring a member-though the computer might be fully powered by the motor-generator of the present invention, but the robotic mechanism suddenly ceases to function because it is usually directly connected to the power line, and the work being welded or transferred may be destroyed or improperly treated, particularly if power is restored after some seconds or minutes later.

To obviate or overcome such problems during a brief or momentary external A.C. power outage, it is a further feature of this invention to convert the A.C. motor itself into an A.C. generator utilizing its rotational energy for producing, say for 15 seconds or more, usable A.C. of moderately varying voltage and frequency for energizing the lighting system and driving auxiliary, peripheral, or other mechanisms concurrently with the A.C. generator supplying the precise A.C. for the computer or other A.C. sensitive equipment.

Figure 8:
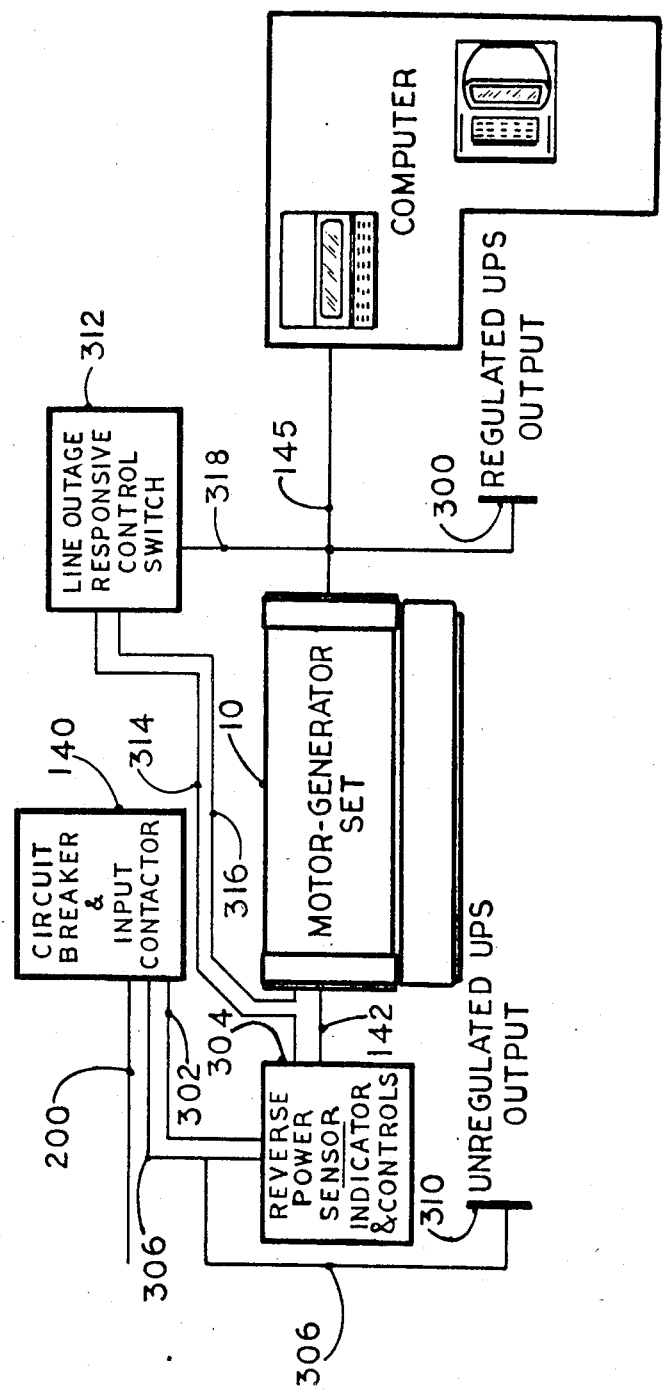
FIG. 8 is a schematic showing of a modified duplex A.C. output to different types of loads.

Referring to FIG. 8, there is shown a schematic diagram of a complete duplex system based on the motor-generator NIPS of this invention. The motor-generator 10 has load circuit conductors 145 supplying precise constant frequency and voltage A.C. to the sensitive loads 300, both during periods when A.C. from the utility power line 200 is flowing and for a period of many seconds when the power line experiences an outage. During any outage or A.C. power line interruption a signal from the reverse power sensor unit 304 causes the circuit breaker 140 to immediately interrupt the circuit to the utility power line 200, otherwise, the motor in the unit 10 would feed A.C. into the line 200. Circuit 306 then supplies power, generated by the motor, from line 142 to the lighting system and other critical auxiliary motors and other peripheral equipment. The A.C. power generated by the motor would not be as precise in voltage and frequency as in line 160, but would be acceptable to such peripheral units. The heavier shell for the rotors would enable both A.C. outputs to be easily maintained for brief power interruptions of up to 15 seconds at full load.

An additional feature of this application in FIG. 8, is to provide means for energizing the motor excitation coil 153 with single phase A.C. corresponding to the frequency and phase of the A.C. being produced by the generator 43 during brief power line outages. Such means comprises a line outage responsive control switch means 312 which functions upon receiving, through line 314, a signal from the reverse power sensor 304 indicating that line 200 is not supplying A.C., and thereupon circuits are closed to convey A.C. through line 318 from the A.C. generator output to line 316 connected to the motor excitation coil 153. Thus the motor excitation coil is energized with A.C. of the same frequency and phase as in the output line 145. This ensures that the frequency in line 306 remains fixed.

It will be understood that the motor generator NIPS units of the present invention may be manufactured in various sizes and output ranges. Small units with A.C. generators of 5 KVA or less output may be at one extreme, while larger units of from 100 KVA, and greater, A.C. capacity are equally practical.

We claim:

1. In a relatively compact, quiet running and highly efficient motor-generator NIPS wherein a driving motor is energized from a source of A.C. electrical power which may be subject to voltage irregularities, frequency irregularities and complete power interruptions for varying periods of time, and the generator is capable of supplying to a load A.C. power of a substantially constant frequency and at a substantially constant voltage at all times when the source is delivering usable A.C. to the driving motor and for a substantial period of the order of many seconds during power interruptions, in combination, a supporting base,
   (A) a synchronous motor on the supporting base with a stator energized from the source of A.C. power to produce a rotating magnetic field, the motor having a rotor capble of rotating synchronously with the rotating magnetic field for driving the rotor of the A.C. generator, and
   (B) the A.C. generator on the supporting base comprising a high rotational inertia rotor comprising (1) a rotatable circular cylindrical shell member mounted for coaxial rotation on bearings on the supporting base, at least one body of soft magnetic material affixed to the inside walls of the shell member, a layer of magnetizable permanent magnetic material attached to the body of soft magnetic material and having an exposed cylindrical surface coaxial with the axis of rotation of the shell, (2) a stator comprising a shaft member fixed to the supporting base and disposed within and along the axis of the rotatable shell member, at least one body of soft magnetic material having a slotted cylinddrical surface affixed to the shaft member and having the slotted surface thereof juxtaposed to and substantially coextensive with the layer of permanent magnetic material with a rotational clearance space therebetween, two of the slots in each body having an intervening pole piece about which an excitation coil is placed, whereby when the excitation coil is energized with single phase A.C. from a control means the pole piece will exert a strong magnetic flux of alternating magnetic polarity whereby the juxtaposed layer of permanent magnetic material will be magnetized during rotation into a selected pattern of north and south magnetic poles, a feedback winding and A.C. power generating windings in other slots in the stator body, and (3) circuit means for connecting the feedback winding to the excitation coil so that during synchronous rotation of the rotor any A.C. potential generated in the excitation coil by the passage of the magnetized poles in the layer is substantially suppressed by the A.C. voltage generated by the poles in the feedback winding.

2. The relatively compact motor-generator NIPS of claim 1, wherein the supporting base includes casing enclosure within which is mounted the rotatable outer cylindrical shell having a high rotational inertia comprising separable sections of which one section has the motor rotor components affixed thereto and another section has the generator rotor components attached thereto, there being disposed within the cylindrical shell the shaft member supporting both the motor and generator stators, both of the stators being juxtaposed and aligned with their respective rotor components, means for joining the sections into a rigid cylindrical shell body, bearing members for rotatably supporting the cylindrical shell about the shaft member, and flexible mounting means for resiliently supporting the bearing members and the shaft member within the casing enclosure.

3. The motor-generator NIPS of claim 2, wherein the cores for both the mtoro stator and the generator stator are retained in fixed position on the same shaft member by compression means applied to the axially outer faces of the cores, the compression means being affixed to the opposite ends of the shaft member whereby the shaft member is under tension between the compression means.

4. The motor-generator NIPS of claim 2, wherein the layer of magnetizable permanent magnetic material in the generator rotor comprises a magnetic material having a coercive force, Hc, in oersteds that is less than about 0.45 of the numerical value of the residual induction, Br, in gauss of the fully saturated magnetic material.

5. The motor-generator NIPS of claim 2, wherein the rotatable cylindrical shell comprises separable shell portions in one of which is disposed the motor rotor components and in the other the generator rotor components, and means for releasably joining the two shell portions into a rigid unitary common rotor.

6. The motor-generator NIPS of claim 1, wherein there is also provided an auxilliary permanent magnet generator having a rotor with a circumferential layer of permanent magnets providing a fixed number of north and south magnetic poles, the circumferential layer being mounted on a rotatable circular ring attached to the exterior of the rotatable cylindrical shell, and a stator juxtaposed and coaxial with the circumferential layer of permanent magnets with a rotational clearance therebetween, the stator comprising a core of high permeability soft magnetic material with windings therein so as to produce an A.C. potential when the circumferential layer of permanent magnets sweeps by, and circuit means for conveying the generated A.C. to the control means associated with the generator.

7. The motor-generator of claim 1, wherein the A.C. generator comprises a plurality of stator cores, the number thereof corresponding to the desired number of phases of the A.C. output of the generator, and the rotor of the generator comprises an equal number of layers of magnetizable permanent magnetic material applied to the rotor core, each of said layers being juxtaposed and substantially coextensive with a stator core, turns of a common power generating winding passing through all of the stator cores, a separate excitation coil being disposed in each stator core with a pole piece coextensive with a layer of permanent magnetic material, and circuit means for applying single phase A.C. to each excitation coil.

8. The motor-generator NIPS of claim 7, wherein there is disposed in each generator stator core a feedback winding located to generate, when the magnetized layer of permanent magnetic material associated with that stator core sweeps by, an A.C. potential of a selected phase and magnitude, and the circuit means to that excitation coil receiving said A.C. potential and combining it with an A.C. potential being generated concurrently in the excitation coil by the magnetized layer sweeping by, so as to substantially suppress, when the rotor is operating at synchronous speed, the A.C. potential being so generated in the excitation coil.

9. The motor-geneator NIPS of claim 7, wherein phase shifting means are connected to the excitation coils in the generator stator to phase shift the single phase A.C. being supplied to at least two excitation coils to thereby shift the pattern of magnetic poles on the layers of permanent magnetic material being magnetized by these excitation coils and thereby phase shift the A.C. being generated by the magnetized layers in the common power windings in the stator, and thus enable control of the voltage output of the power windings.

10. The motor-generator NIPS of claim 1, wherein the A.C. generator comprises at least one rotor body of soft magnetic material with a plurality of layers of permanent magnetic material attached to the rotatable shell member each having an exposed cylindrical surface and the stator comprises an equal number of slotted bodies of soft magnetic material, corresponding in number to the number of layers of permanent magnetic material, each slotted body having in the slots an excitation coil, A.C. power generating windings, and a feedback winding coupled in circuit with its excitation coil so as to suppress any A.C. potential generated in the excitation coil when the motor is at synchronous speed, the excitation coils being symmetrically circumferentially spaced with respect to each other,and the A.C. power generating windings of all the stator bodies comprising individual turns each passing through all of the stator slots so that a part of the total A.C. potential is generated in each winding in each stator core through which it passes.

11. The motor-generator NIPS of claim 1, wherein circuit interruption and control means are interposed between the source of electrical A.C. power which function is to break the circuit thereto on failure of the source of A.C. power, and to connect the windings of the motor stator to another load during such source power failure, the motor functioning as an A.C. generator during such period of failure, and means for supplying the excitation coil of the motor single phase A.C. from the A.C. generator.

12. In an A.C. generator, a rotor comprising a body of soft magnetic material having a surface on which a layer of magnetizable permanent magnetic material is held in place, the layer having an exposed circular cylindrical surface coaxial with the axis of rotation of the rotor, a stator comprising a body of soft magnetic material having a slotted exposed cylindrical surface coaxial with the axis of the rotor juxtaposed and closely adjacent to the exposed cylidrical surface of the layer of magnetic material in the rotor, with a rotational clearance between the surface, at least two adjacent slots in the body of the stator having a pole piece therebetween about which an excitation coil is placed so that when single phase A.C. passes through the excitation coil the pole piece is capable of magnetizing the layer of permanent magnetic material into a selected pattern of no north and south poles during rotation of the rotor, there being A.C. potentials generated in the excitation coil by passage of the magnetized poles during such rotation, and A.C. power generating windings in other slots in the stator in which A.C. output power is generated when the rotor with the magnetized poles in the layer rotates about the stator, the improvement comprising feedback windings placed in selected slots in the slotted stator body to generate an A.C. potential of a selected phase and magnitude and circuit means connecting the feedback windings and the excitation coil so that when the rotor is rotating at synchronous speed, the A.C. potentials from the feedback winding will substantially suppress the A.C. potentials being generated in the excitation coil.

13. The A.C. generator of claim 12, wherein a polyphase A.C. potential output is produced by the power generating windings, comprising a rotor having a number of close axially disposed layers of the magnetizable permanent magnetic material corresponding to the number of phases of the A.C. power output, the stator having a similar number of axially adjacent bodies of slotted soft magnetic material, the slots being generally axially directed, one body being aligned and juxtaposed with each layer in the rotor, the A.C. power generating windings being placed in the stator slots so that each turn of the widnings passes in a substantially axial direction through successive slots in each body, and A.C. power output leads from the windings extending to the exterior.

14. The A.C. generator of claim 12, wherein the A.C. power generating windings produce a polyphse A.C. output, comprising a rotor having a number of adjacent axially disposed layers of permanent magnetic material corresponding to the number of phases of the polyphase A.C. output, the stator having a similar number of axially adjacent bodies of slotted soft magnetic material, one slotted body being aligned with each layer and juxtaposed therewith, an excitation coil disposed in adjacent slots with a pole piece in each stator body and feedback winding disposed in slots in each body of the stator, the excitation coil and the feedback winding in each body generating an A.C. potential when the layer of permanent magnetic material has been magnetized into a selected pattern of north and south magnetic poles by the pole piece and is rotating with respect to the stator, circuit means for connecting the excitation coil and the feedback winding in each body so that the A.C. potential in the feedback winding will substantially suppress the A.C. potential in the excitation coil when the rotor is rotating at synchronous speed, and means for producing single phase A.C. potential of a selected frequency, magnitude and phase relation for each excitation coil and circuit means for conveying to each excitation coil the single phase A.C. so produced whereby its pole piece will magnetize its juxtaposed layer of permanent magnetic material into a desired pattern of north and south magnetic poles so that the rotating layer will generate in the A.C. power windings polyphase A.C. of a desired frequency and voltage.

* * * * *